(12) United States Patent
Imai

(10) Patent No.: US 9,392,263 B2
(45) Date of Patent: Jul. 12, 2016

(54) 3D SCANNER, 3D SCAN METHOD, COMPUTER PROGRAM, AND STORAGE MEDIUM

(71) Applicant: CANON KABUSHIKI KAISHA, Tokyo (JP)

(72) Inventor: Hitoshi Imai, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/819,238

(22) Filed: Aug. 5, 2015

(65) Prior Publication Data

US 2016/0044300 A1 Feb. 11, 2016

(30) Foreign Application Priority Data

Aug. 8, 2014 (JP) .................................. 2014-162942

(51) Int. Cl.
| | |
|---|---|
| H04N 1/04 | (2006.01) |
| H04N 13/02 | (2006.01) |
| H04N 1/00 | (2006.01) |
| G06F 3/12 | (2006.01) |
| H04N 13/00 | (2006.01) |

(52) U.S. Cl.
CPC .......... *H04N 13/0275* (2013.01); *G06F 3/1215* (2013.01); *G06F 3/1219* (2013.01); *G06F 3/1256* (2013.01); *H04N 1/00278* (2013.01); *H04N 13/0253* (2013.01); *H04N 13/0257* (2013.01); *H04N 13/0296* (2013.01); *H04N 2013/0077* (2013.01); *H04N 2013/0096* (2013.01)

(58) Field of Classification Search
None
See application file for complete search history.

(56) References Cited

U.S. PATENT DOCUMENTS

| | | | | |
|---|---|---|---|---|
| 5,894,529 A * | 4/1999 | Ting | .................... | G01B 11/024 358/474 |
| 8,929,642 B2 * | 1/2015 | Ichimaru | .............. | G06T 1/0014 356/3.1 |
| 2007/0273687 A1 * | 11/2007 | Daniel | ............... | G01B 11/2518 345/420 |
| 2008/0246757 A1 * | 10/2008 | Ito | .......................... | G06T 15/10 345/419 |
| 2009/0067706 A1 * | 3/2009 | Lapa | .................... | G01B 11/245 382/154 |
| 2010/0271368 A1 * | 10/2010 | McNamara | .......... | G06T 7/0051 345/420 |
| 2013/0076860 A1 * | 3/2013 | Liu | ....................... | G06T 15/205 348/46 |
| 2015/0051489 A1 * | 2/2015 | Caluser | ................ | A61B 8/0825 600/440 |
| 2015/0054918 A1 * | 2/2015 | Lee | .................... | H04N 13/0221 348/46 |
| 2015/0109424 A1 * | 4/2015 | Lee | ........................ | A61C 9/006 348/50 |
| 2015/0138320 A1 * | 5/2015 | El Daher | .............. | G01B 5/0002 348/46 |
| 2015/0172630 A1 * | 6/2015 | Hsieh | ................... | G01B 21/047 348/50 |

FOREIGN PATENT DOCUMENTS

| | | |
|---|---|---|
| JP | 2002-74347 A | 3/2002 |
| JP | 2007-508557 A | 4/2007 |

* cited by examiner

*Primary Examiner* — Dung Tran
(74) *Attorney, Agent, or Firm* — Canon USA Inc. IP Division

(57) ABSTRACT

A 3D scanner includes a stage on which a target object, which is targeted for scan, is to be located, a location object that is to be placed on the stage during scan and on which the target object is to be located during scan, a display unit configured to display an image on the stage, an imaging unit configured to perform image capturing on the stage, and a control unit configured to generate 3D model data of the target object based on a video image of the target object captured by the imaging unit, and to cause the display unit to display, on the stage, an image indicating a direction in which to move the target object, based on video images of the target object and the location object captured by the imaging unit.

16 Claims, 24 Drawing Sheets

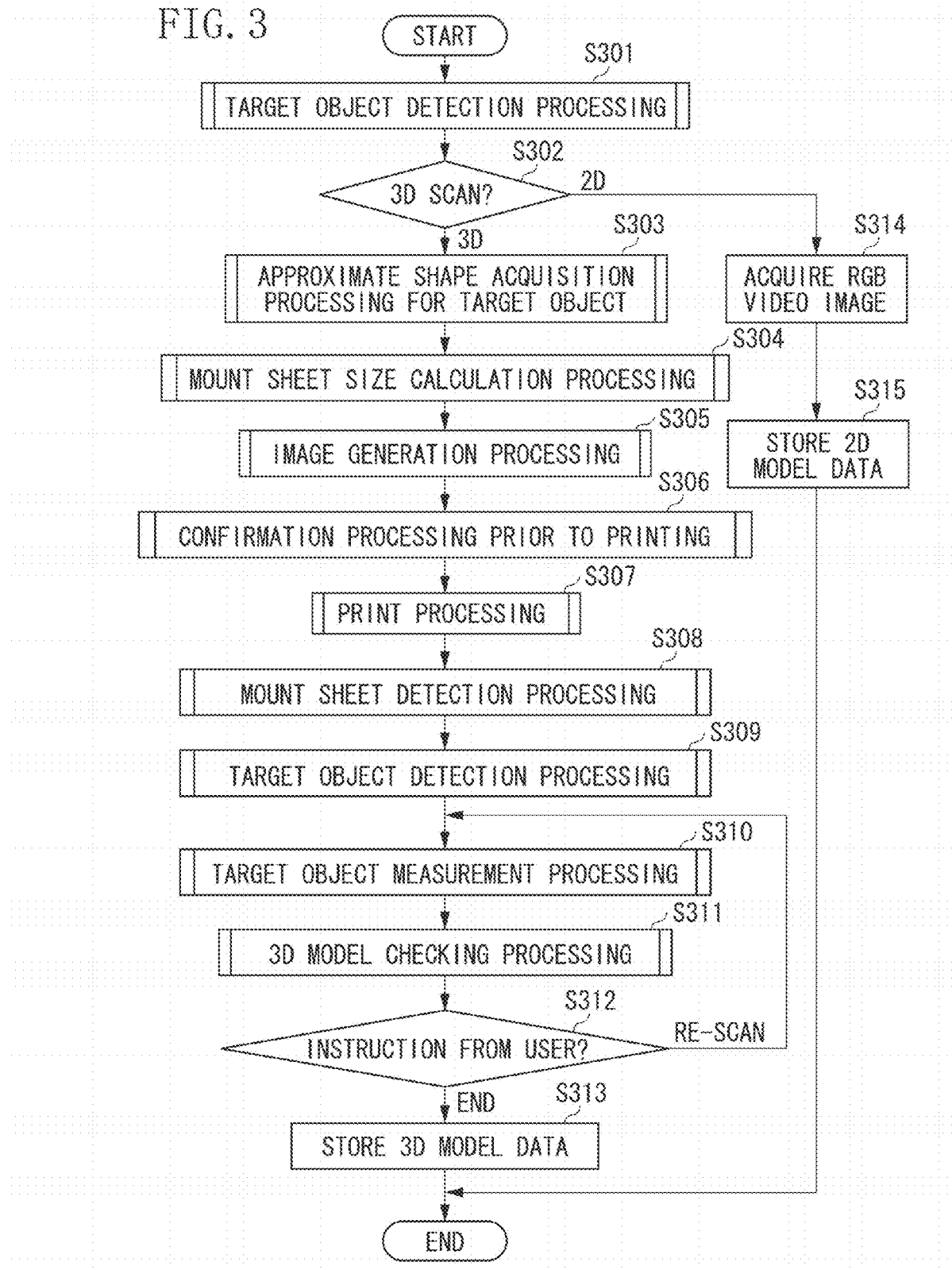

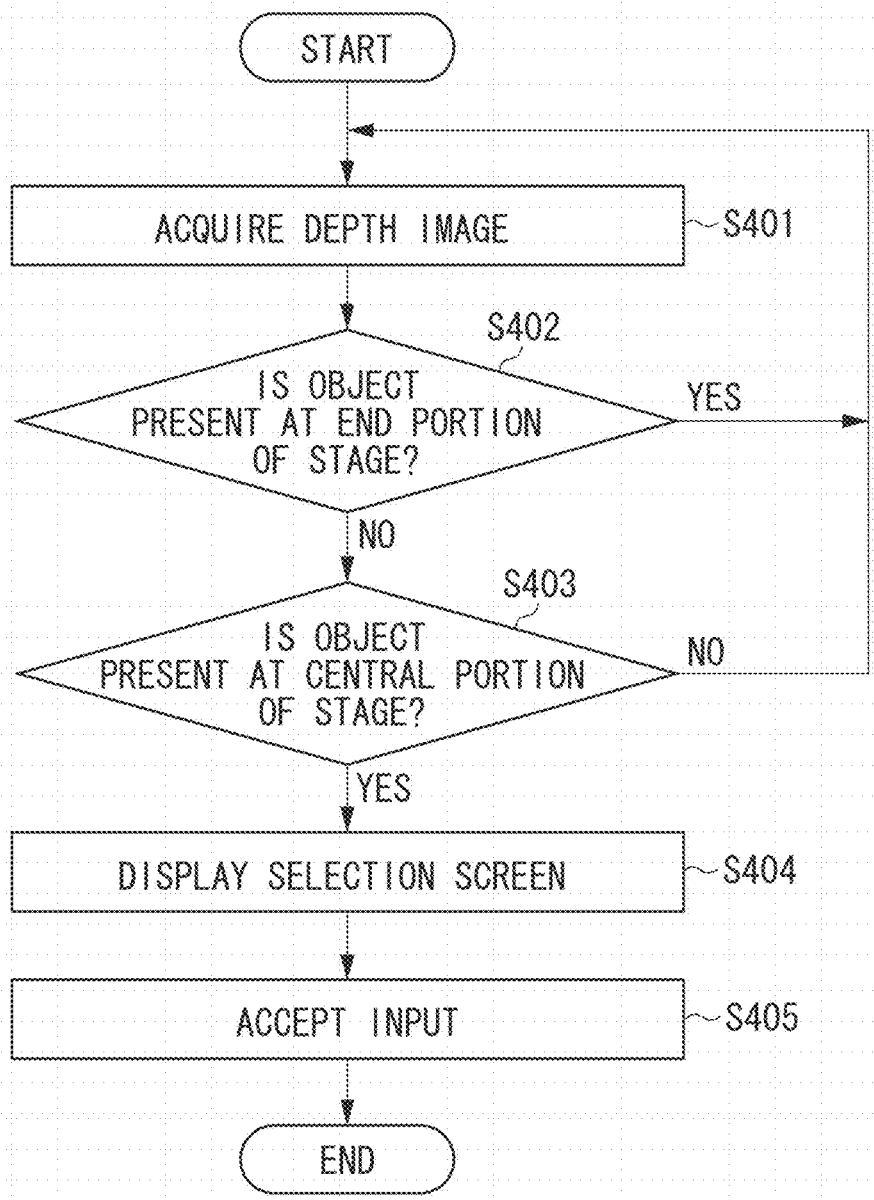

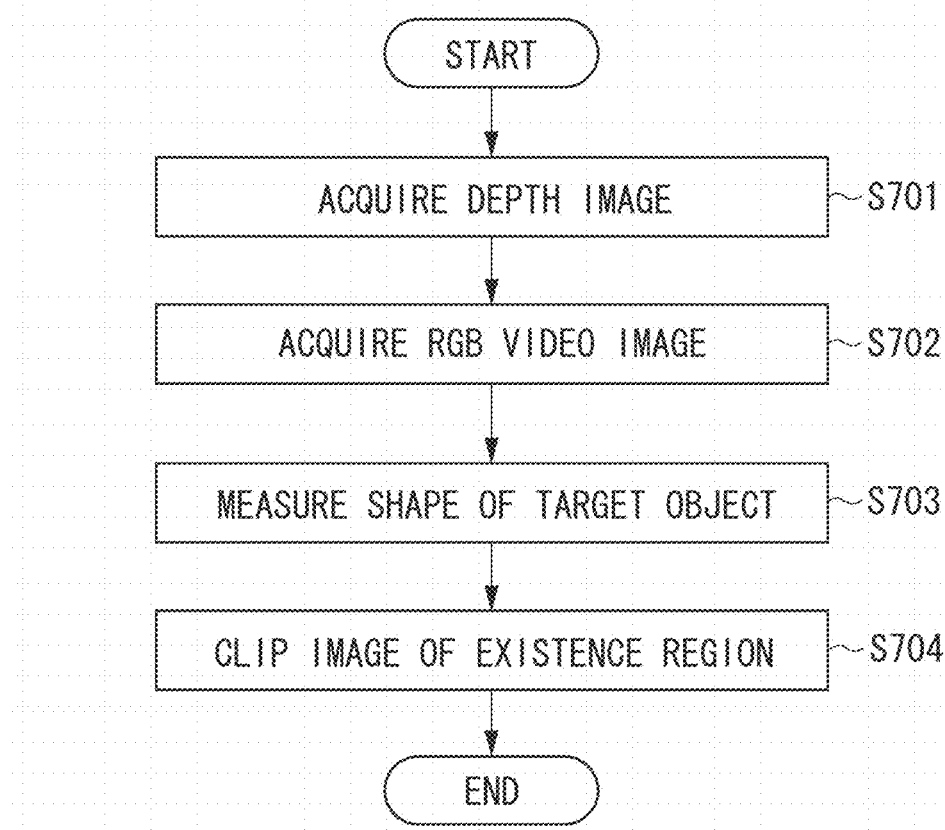

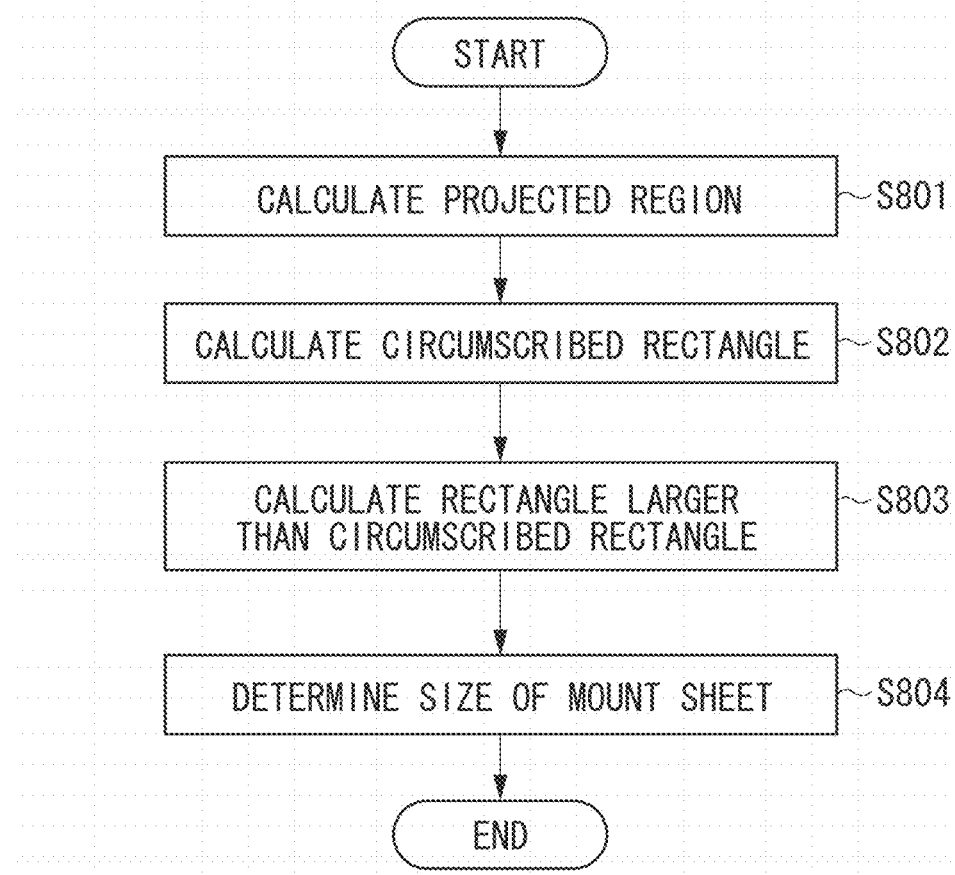

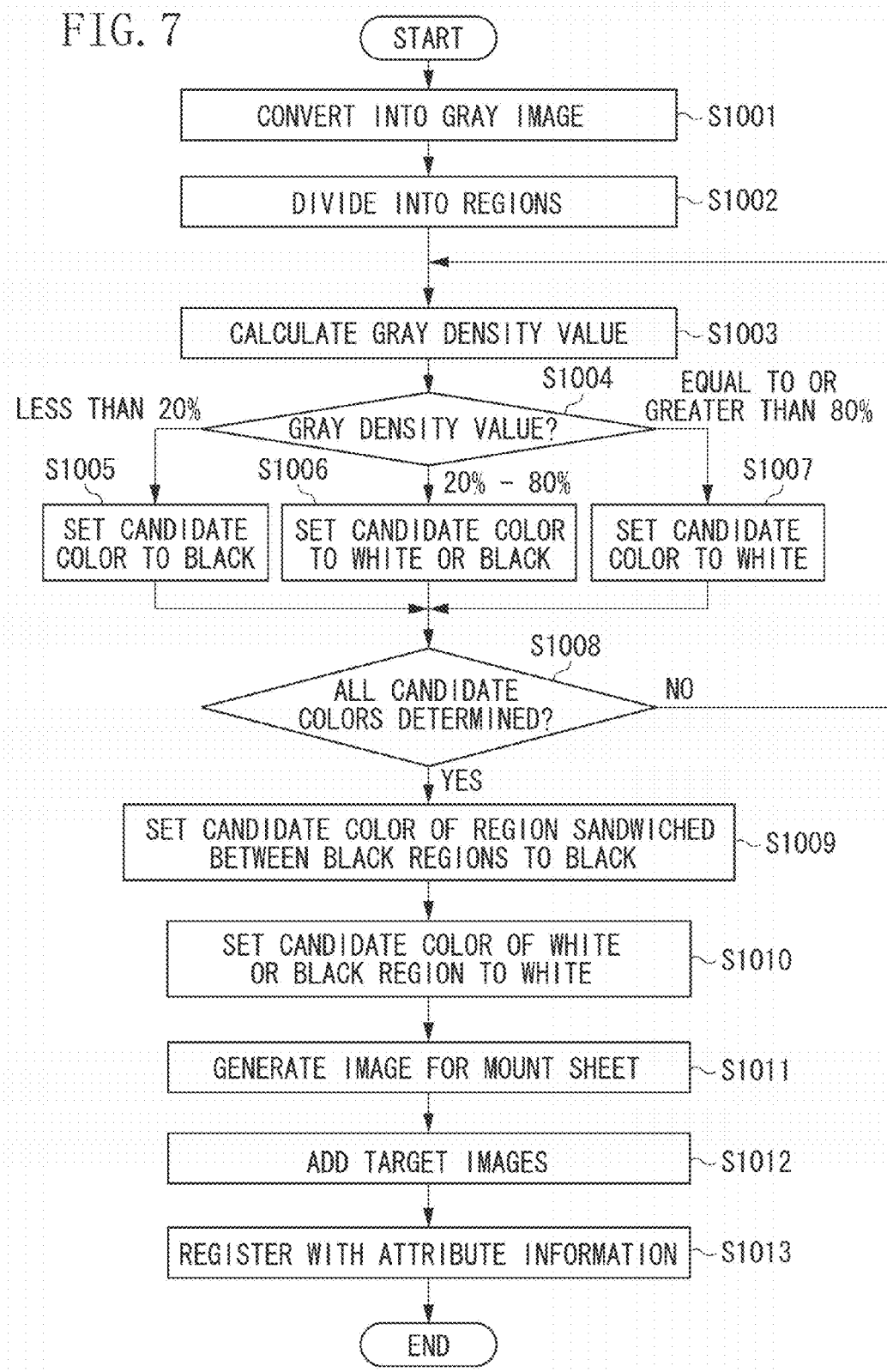

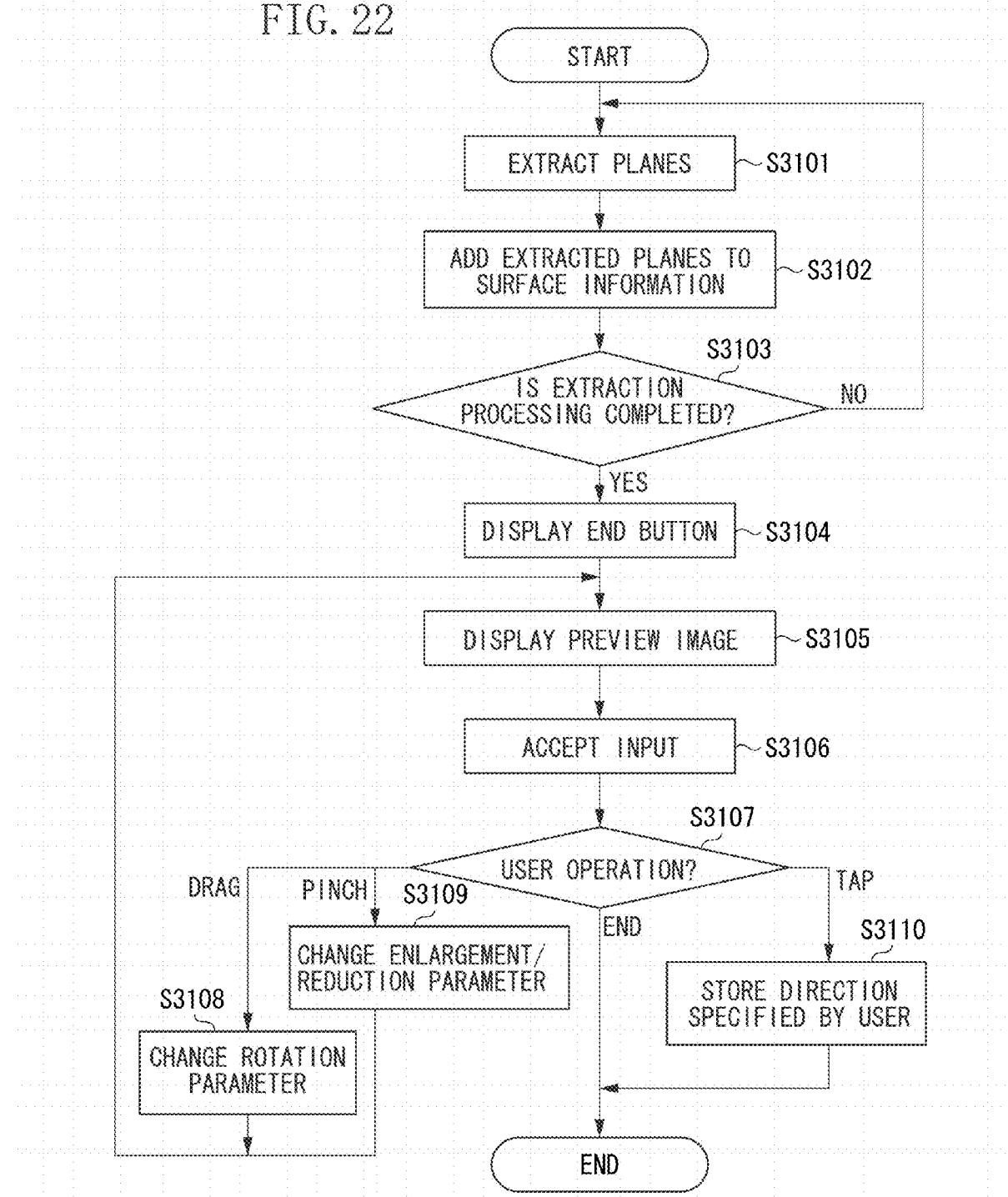

3D SCANNER, 3D SCAN METHOD, COMPUTER PROGRAM, AND STORAGE MEDIUM

BACKGROUND OF THE INVENTION

1. Field of the Invention

Aspects of the present invention generally relate to a three-dimensional (3D) scanner that measures the 3D shape of a target object, which is targeted for scan, in a non-contact manner.

2. Description of the Related Art 3D scanners construct 3D models by combining results that are obtained by optically measuring a target object from a plurality of directions. However, in a case where the surface of a target object has no features, the positions or angles for combining results obtained by measuring the target object cannot be specified, so that it is difficult to construct an accurate 3D model. Therefore, a scheme capable of specifying the position or orientation of a target object is ordinarily used together with a 3D scanner to calculate the combining position or angle. In this regard, in order to accurately and efficiently construct a 3D model, it is important for a target object to be located in an accurate position and to be measured from necessary directions.

Japanese Unexamined Patent Application Publication (Translation of PCT Application) No. 2007-508557 discusses a method in which, in order to accurately specify the position of a target object, the target object is located on a scan template member, which has a known two-dimensional plate, and is then scanned. This method enables accurately grasping the position of the target object based on the positional relationship between images of the two-dimensional plate and the target object that are included in a video image captured by a camera, thus enhancing the precision of construction of a 3D model. Japanese Patent Application Laid-Open No. 2002-74347 discusses a technique of, with the use of a handy 3D scanner, instructing the user as to in which direction to move the 3D scanner.

Stationary 3D scanners can perform accurate 3D scan accordingly as the user appropriately locates, moves, and rotates a target object. If an index used for the user to uniquely grasp an optimum scan position or orientation of the target object is present on a stage on which to locate the target object during scan, the user can promptly locate the target object in an appropriate position. In conventional methods, an instruction screen used for providing an instruction on the position or orientation of a target object is displayed on, for example, the display screen of a personal computer, and the user gropes for an appropriate position according to the instruction screen. This may cause the user to feel stress, thus disturbing prompt 3D scan processing.

SUMMARY OF THE INVENTION

Aspects of the present invention generally include a stationary 3D scanner that enables a target object to be promptly located in an appropriate position.

According to an aspect of the present invention, a 3D scanner includes a stage on which a target object, which is targeted for scan, is to be located, a location object that is to be placed on the stage during scan and on which the target object is to be located during scan, a display unit configured to display an image on the stage, an imaging unit configured to perform image capturing on the stage, and a control unit configured to generate 3D model data of the target object based on a video image of the target object captured by the imaging unit, and to cause the display unit to display, on the stage, an image indicating a direction in which to move the target object, based on video images of the target object and the location object captured by the imaging unit.

Further features of the present invention will become apparent from the following description of exemplary embodiments with reference to the attached drawings.

BRIEF DESCRIPTION OF THE DRAWINGS

FIG. 3 is a flowchart illustrating 3D scan processing.

FIG. 4 is a flowchart illustrating target object detection processing.

FIG. 5 is a flowchart illustrating approximate shape acquisition processing.

FIG. 6 is a flowchart illustrating mount sheet size calculation processing.

FIG. 7 is a flowchart illustrating image generation processing.

FIG. 22 is a flowchart illustrating 3D model checking processing.

DESCRIPTION OF THE EMBODIMENTS

Various exemplary embodiments, features, and aspects of the invention will be described in detail below with reference to the drawings.

<Configuration>

Figure 1:
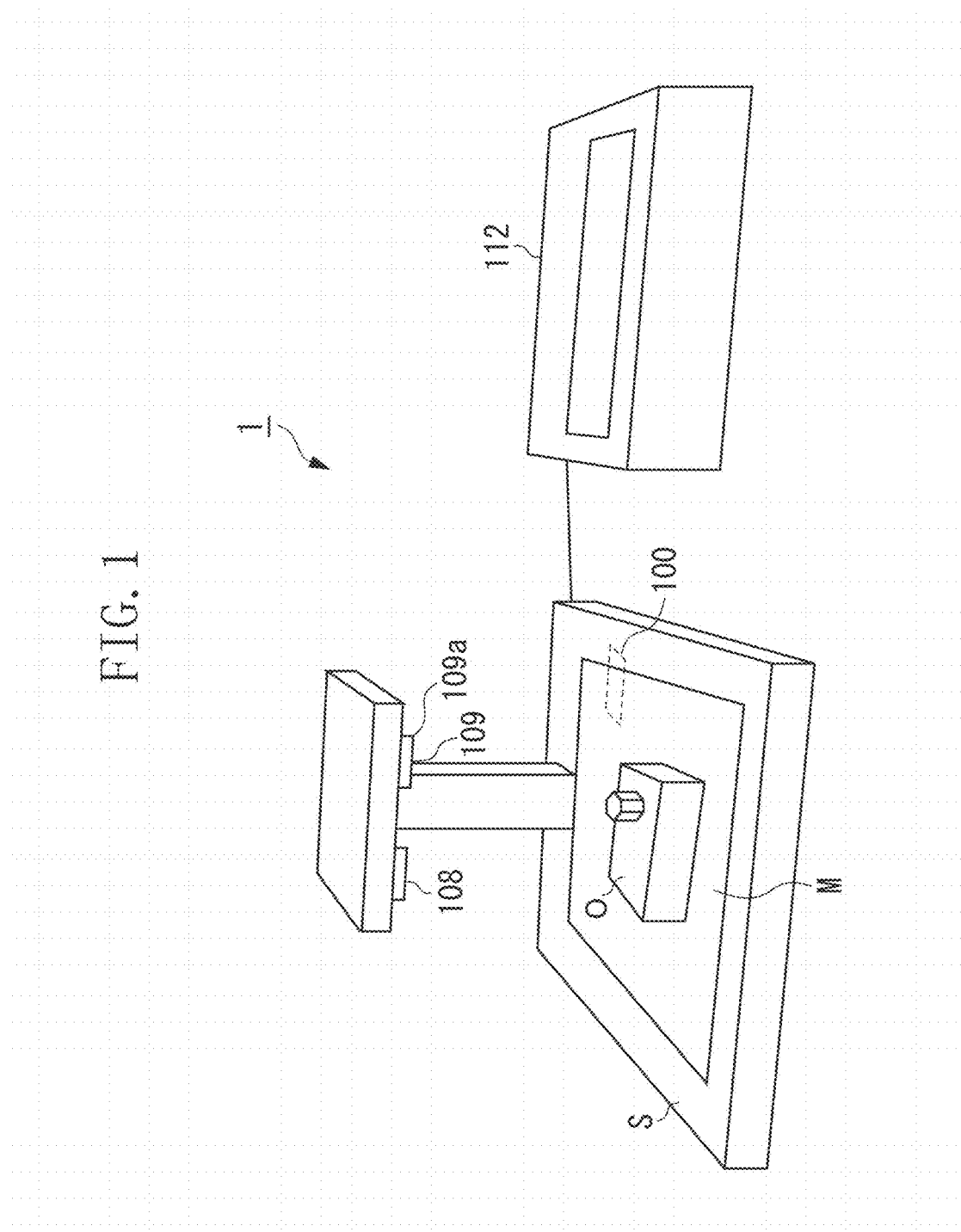
FIG. 1 illustrates an example of a configuration of a three-dimensional (3D) scan apparatus.

FIG. 1 illustrates an example of a configuration of a three-dimensional (3D) scan apparatus (a 3D scanner 1) according to an exemplary embodiment. The 3D scanner 1 includes a stage S, on which a target object O, which is targeted for scan, is to be located during 3D scan. Above the stage S, there are mounted a projector 108 and a camera 109, in which an infrared emitter 109a is incorporated. The projector 108 is arranged to project an image onto the stage S. The camera 109 is arranged to perform image capturing on the whole stage S, which includes a target object O on the stage S. The infrared emitter 109a is arranged to illuminate the stage S with infrared light. In addition, the 3D scanner 1 is provided with a printer 112.

The camera 109 converts a captured video image into a digital signal including red-green-blue (RGB) luminance information. Furthermore, during 3D scan, the camera 109 causes the infrared emitter 109a to radiate infrared light and performs image capturing by receiving reflected light arising from the radiated infrared light. The distance between the camera 109 and the target object O can be calculated based on the time of emission of infrared light and the time of reception of the reflected light. The projector 108 projects and displays, on the stage S, information of which the user needs to be notified. The printer 112 performs printing on a paper medium. In particular, in the present exemplary embodiment, the printer 112 prints various pieces of information for positioning on a mount sheet M, which is used to perform positioning during scanning of the target object O. The mount sheet M is placed on the stage S, and the target object O is located on the mount sheet M. The operation of each unit of the 3D scanner 1 is controlled by a controller 100, which is a type of computer.

Figure 2:
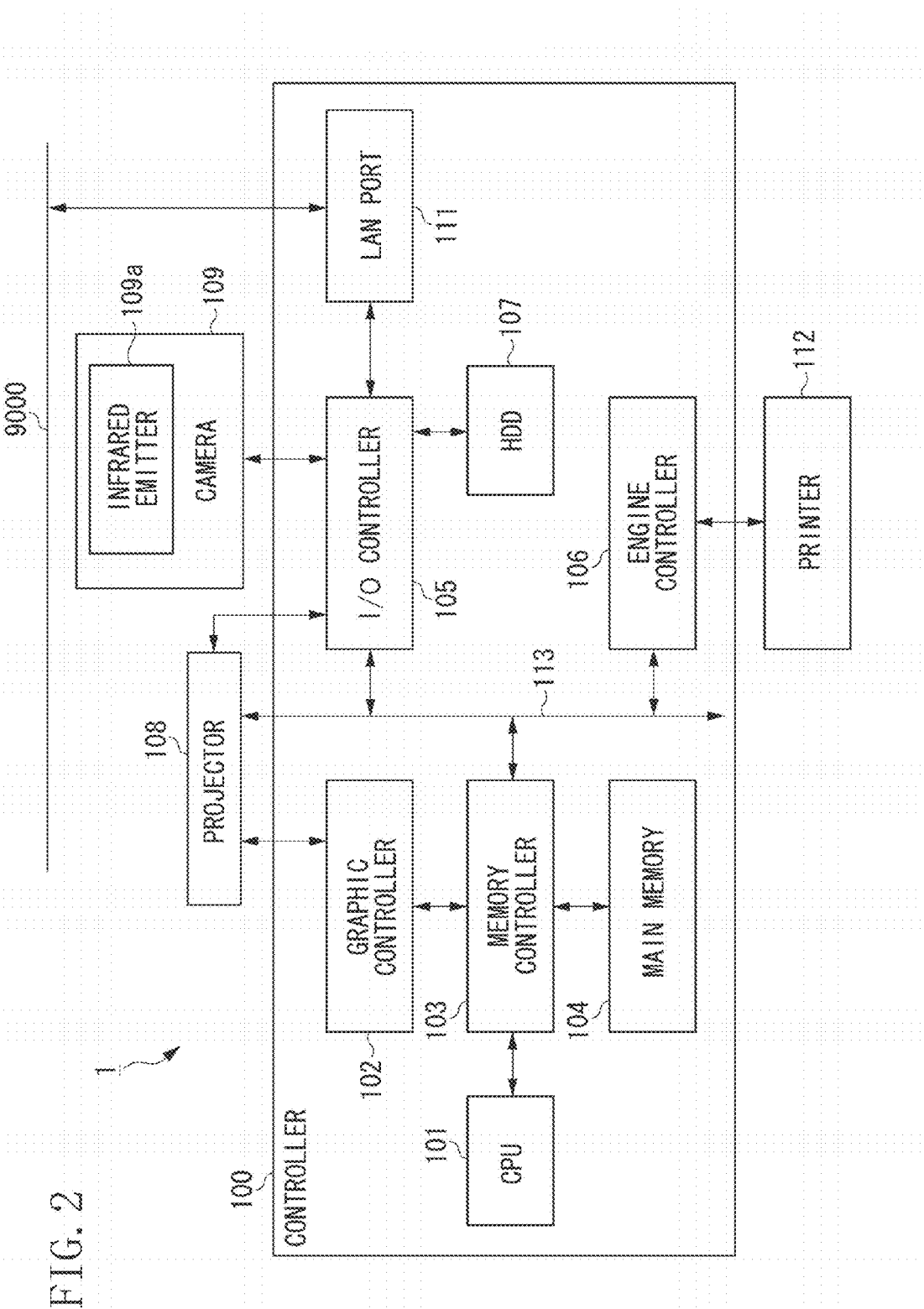
FIG. 2 illustrates an example of a hardware configuration of a controller.

FIG. 2 illustrates a hardware configuration of the controller 100. The controller 100 is connected to the projector 108, the camera 109, and the printer 112, and is able to communicate with other devices via a network 9000, such as a local area network (LAN). The controller 100 includes a central processing unit (CPU) 101, a graphic controller 102, a memory controller 103, a main memory 104, an input-output (I/O) controller 105, an engine controller 106, a hard disk drive (HDD) 107, a local area network (LAN) port 111, and an internal bus 113. The internal bus 113 allows data to be transmitted and received between the memory controller 103, the I/O controller 105, and the engine controller 106.

The I/O controller 105 controls the transmission and reception of data between each of the HDD 107, the LAN port 111, the camera 109, and the projector 108 and each further hardware unit connected to the I/O controller 105 via the internal bus 113. The LAN port 111 is a communication interface with other apparatuses, such as personal computers (PCs), connected thereto via the network 9000. The LAN port 111 inputs data received via the network 9000 to the I/O controller 105, and transmits data received from the I/O controller 105 to another apparatus via the network 9000. The HDD 107 is a computer-readable storage medium storing computer programs, such as a boot program and a control program for controlling the 3D scanner 1. Furthermore, the HDD 107 stores 3D model data representing a 3D model obtained as a result of scanning the target object O. The engine controller 106 exchanges data with the printer 112 to control an operation of the printer 112 so as to perform print processing on a paper medium.

The memory controller 103 controls the overall memory access to the main memory 104. The CPU 101, the graphic controller 102, and the main memory 104 are connected to the memory controller 103 without via the internal bus 113.

The main memory 104 is a non-volatile memory and allows high-speed access thereto. Therefore, a program read out from the HDD 107 can be loaded on the main memory 104 during execution of the program, and data to be temporarily used can be stored in the main memory 104. The CPU 101 reads out a boot loader program from the HDD 107 when the 3D scanner 1 is powered on and executes the boot loader program, and then reads out a control program for the 3D scanner 1 and loads the control program onto the main memory 104. The CPU 101 executes the control program for the 3D scanner 1, which has been loaded on the main memory 104, to function to control the overall processing in the 3D scanner 1.

The CPU 101 controls the graphic controller 102 by executing the 3D scanner control program. The graphic controller 102 controls displaying of an image by the projector 108. The CPU 101 controls an operation of the camera 109 by executing the control program for the 3D scanner 1 so as to cause the infrared emitter 109a, incorporated in the camera 109, to radiate infrared light and to cause the camera 109 to capture an image with reflected light arising from the radiated infrared light. The CPU 101 generates 3D model data based on a video image captured by the camera 109.

The CPU 101 is able to interpret the gesture of a person (the user) based on a video image captured by the camera 109. For example, when the camera 109 captures a video image of the gesture of the user performed on an image projected on the stage S by the projector 108, the CPU 101 interprets the gesture of the user based on the captured video image. The CPU 101 performs processing according to the interpreted gesture of the user. In this way, a user interface can be constructed based on an image projected by the projector 108 and a video image captured by the camera 109.

The CPU 101 controls an operation of the engine controller 106 by executing the control program for the 3D scanner 1 so as to cause the printer 112 to perform print processing. Accordingly, the CPU 101 is able to cause the printer 112 to print, on the mount sheet M, information available for appropriately locating the target object O on the mount sheet M. Furthermore, the CPU 101 performs communication with another apparatus via the LAN port 111.

The 3D scanner 1 with the above-described configuration performs 3D scan of the target object O and generates 3D model data according to the following processing.

<3D Scan Processing>

FIG. 3 is a flowchart illustrating 3D scan processing performed on the target object O by the 3D scanner 1.

In step S301, the CPU 101 detects that the target object O, which is targeted for 3D scan, has been located on the stage S, based on a video image captured by the camera 109. In this instance, the CPU 101 accepts the setting for scan from the user. More specifically, in step S302, the CPU 101 determines whether 3D scan or two-dimensional (2D) scan has been set by the user to be performed on the target object O. It is to be noted that, at this time, the mount sheet M has not yet been generated by printing, and the target object O is placed directly on the stage S.

If it is determined that 3D scan has been set (3D in step S302), then in step S303, the CPU 101 acquires the approximate shape of the target object O. The CPU 101 acquires the approximate shape of the target object O based on a video image captured by the camera 109. In step S304, the CPU 101 calculates the size of the mount sheet M based on the approximate shape of the target object O. After calculating the size of the mount sheet M, in step S305, the CPU 101 generates an image that is to be formed on the mount sheet M. The image that is to be formed on the mount sheet M includes various pieces of information for positioning and is used to indicate, to the user, the location of the target object O during 3D scan. In step S306, the CPU 101 causes the projector 108 to preview the generated image on the stage S. This prompts the user to confirm the previewed image. Upon completion of the user's confirmation of the image, then in step S307, the CPU 101 causes the printer 112 to perform print processing. This results in the mount sheet M on which the image has been printed being generated.

The user locates, on the stage S, the mount sheet M on which the image has been printed. In step S308, the CPU 101 detects that the mount sheet M has been located on the stage S, based on a video image captured by the camera 109. After the mount sheet M has been located on the stage S, then in step S309, the CPU 101 detects that the target object O has been located on the mount sheet M, based on a video image captured by the camera 109.

After detecting that the target object O has been located, then in step S310, the CPU 101 performs measurement processing on the shape of the target object O based on a video image captured by the camera 109. This results in the target object O being 3D scanned. In step S311, the CPU 101 causes the projector 108 to display, on the stage S, a 3D model obtained as a result of measuring the shape of the target object O. The user checks the 3D model based on the displayed 3D model. As a result of checking of the 3D model, if the user determines that re-scan is required, the user issues an instruction to perform re-scan, and if the user determines that re-scan is not required, the user issues an instruction to end scan. In step S312, the CPU 101 determines whether an instruction has been issued to perform re-scan or to end scan. If it is determined that an instruction has been issued to perform re-scan (RE-SCAN in step S312), the CPU 101 returns to processing in step S310, in which the CPU 101 performs measurement processing on the target object O again. Processing in steps S310 to S312 is repeated until the user issues an instruction to end scan. If it is determined that an instruction has been issued to end scan (END in step S312), then in step S313, the CPU 101 stores 3D model data of the 3D model checked by the user into the HDD 107. Then, the processing ends.

If, in step S302, it is determined that 2D scan has been set (2D in step S302), then in step S314, the CPU 101 acquires an RGB video image captured by the camera 109. In step S315, the CPU 101 converts the acquired RGB video image into 2D model data and stores the 2D model data into the HDD 107. Then, the processing ends In the following, the details of each processing illustrated in FIG. 3 are described.

FIG. 4 is a flowchart illustrating target object detection processing in step S301 illustrated in FIG. 3.

The CPU 101 detects the target object O on the stage S based on a video image acquired with infrared shooting. The camera 109 causes the infrared emitter 109a to irradiate the stage S with infrared light. The camera 109 performs image capturing on the stage S, which is being irradiated with infrared light, thus acquiring a video image with infrared shooting.

To this end, first, in step S401, the CPU 101 acquires a depth image on the stage S based on a video image captured by the camera 109 with infrared shooting. The techniques to acquire a depth image have been put into practical use with many products, such as Kinect (registered trademark) of Microsoft Corporation and Carmine of PrimeSense, which was bought by Apple Inc., and are widely known. Therefore, the detailed description of the depth image acquisition is omitted.

In step S402, the CPU 101 determines whether a three-dimensional object is present at an end portion of the stage S, which is the boundary between the region inside the stage S and the region outside the stage S, based on the depth image. In a case where the user locates the target object O on the stage S, the user's hand, with which to locate the target object O, once enters above the stage S. Therefore, if the user's hand (a three-dimensional object) is present at the boundary portion of the stage S (YES in step S402), the CPU 101 determines that the target object O has not been completely located on the stage S, and then acquires a depth image again.

If it is determined that no three-dimensional object is present at the boundary portion of the stage S (NO in step S402), then in step S403, the CPU 101 determines, based on the depth image, whether a three-dimensional object is present at the central portion of the stage S. For example, in a state in which only the target object O is located on the stage S as illustrated in FIG. 1, the CPU 101 determines that a three-dimensional object is present at the central portion of the stage S. If it is determined that no three-dimensional object is present at the central portion of the stage S (NO in step S403), the CPU 101 determines that the target object O has not yet been located on the stage S, and then in step S401, acquires a depth image again.

If it is determined that a three-dimensional object is present at the central portion of the stage S (YES in step S403), then in step S404, the CPU 101 causes the projector 108 to display, on the stage S, a selection screen for prompting the user to select any one of "3D scan" and "2D scan". The user can select any one of "3D scan" and "2D scan" with gestures via the selection screen. In step S405, the CPU 101 accepts an input from the user's gestures. This results in "3D scan" or "2D scan" being set to the 3D scanner 1. This setting is used for the CPU 101 to make a determination in step S302 illustrated in FIG. 3.

The input from the user's gestures can be recognized, for example, based on a video image captured by the camera 109. For example, the CPU 101 accepts the user's selection based on the display regions of "3D scan" and "2D scan" within the selection screen and the position of the user's finger. Besides, the user's selection may be recognized according to a method of using a depth image acquired by the above-mentioned Kinect (registered trademark) or a known fingertip detection technique. In this way, the CPU 101 can detect that the target object O has been located on the stage S and can accept the setting of "3D scan" or "2D scan".

FIG. 5 is a flowchart illustrating processing for acquiring the approximate shape of the target object O in step S303 illustrated in FIG. 3. If 3D scan has been set to be performed on the target object O, then in step S701, the CPU 101 acquires a depth image on the stage S based on a video image acquired by the camera 109 with infrared shooting. The acquisition of a depth image is performed in processing similar to that in step S401 illustrated in FIG. 4. The CPU 101, when having acquired a depth image, stops the infrared emitter 109a of the camera 109 from radiating infrared light, and causes the camera 109 to perform ordinary shooting with visible light. Accordingly, in step S702, the CPU 101 acquires an RGB video image composed of RGB luminance information about the stage S.

In step S703, the CPU 101 measures the shape of the target object O by calculating the existence region of the target object O within the range shot by the camera 109 from the depth image. In step S704, the CPU 101 clips an image of the existence region of the target object O from the RGB video image based on the measured shape of the target object O, and then ends the processing. The clipped image is treated as the approximate shape of the target object O.

FIG. 6 is a flowchart illustrating processing for calculating the size of the mount sheet M in step S304 illustrated in FIG. 3.

In step S801, the CPU 101 calculates a projected region that is obtained as a result of projecting an image of the target object O onto the stage S, from the approximate shape of the target object O acquired by processing in step S303 illustrated in FIG. 3. In step S802, the CPU 101 calculates a circumscribed rectangle of the calculated projected region. In step S803, the CPU 101 calculates a rectangle with each side larger than that of the calculated circumscribed rectangle by a predetermined length (for example, 5 cm). In step S804, the CPU 101 calculates a minimum regular paper size into which the calculated rectangle fits, and stores the calculated minimum regular paper size as the size of the mount sheet M into attribute information about the mount sheet M. The attribute information about the mount sheet M is stored into the main memory 104. Table 1 below shows an example of attribute information about the mount sheet M.

TABLE 1

| Attribute type | parameter |
| --- | --- |
| Paper type | plain paper |
| Size | A4 |
| Positional marker A | coordinates: (40, 40) |
| Positional marker B | coordinates: (40, 170) |
| Positional marker C | coordinates: (257, 40) |
| Positional marker D | coordinates: (257, 170) |
| Index 1 | coordinates: (149, 40), shape: triangle, rotation angle: 0, color: blue |
| Index 2 | coordinates: (149, 170), shape: triangle, rotation angle: 180, color: red |
| Region to be colored black | coordinates: (70, 50, 180, 150), shape: oval, thickness: 25 |

The attribute information about the mount sheet M includes stored therein, besides the size of the mount sheet M, the paper type, the positions of positional markers A to D, which are described below, the positions of indexes 1 and 2, the region to be colored black. In Table 1, "A4" is stored as the size of the mount sheet M. The positional markers A to D and the indexes 1 and 2 are target images serving as markers used to locate the mount sheet M on the stage S during 3D scan. Since the size of the mount sheet M is set larger than that of the circumscribed rectangle, these target images can be printed on the mount sheet M in such a way as not to overlap the region in which the target object O is located on the mount sheet M.

Figure 8A:
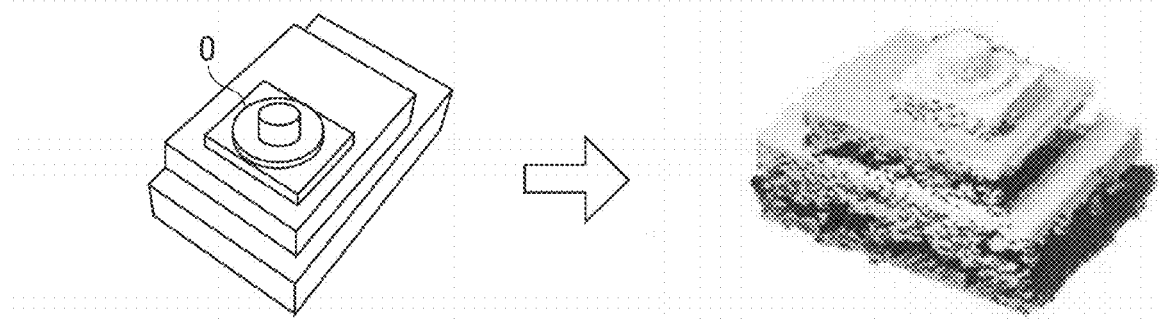
FIG. 8A illustrates the depth image of a target object.
Figure 8B:
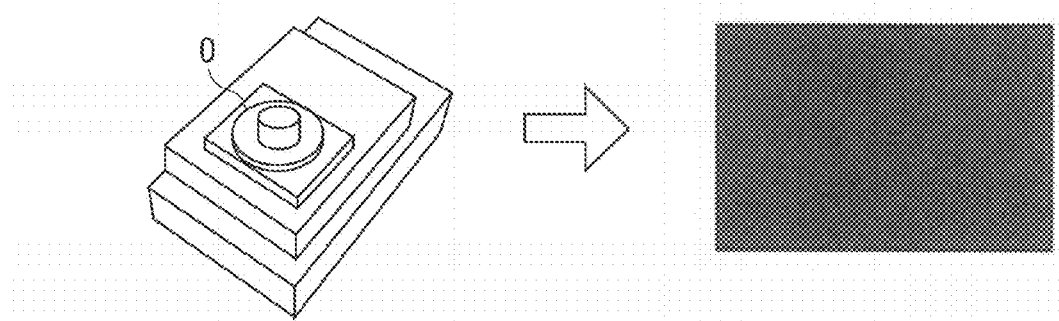
FIG. 8B illustrates a color that greatly differs in luminance from that of the target object.

FIG. 7 is a flowchart illustrating processing for generating an image that is to be printed on the mount sheet M in step S305 illustrated in FIG. 3. In this processing, first, the CPU 101 determines a color to be applied to a region in which the target object O is to be located on the mount sheet M. FIGS. 8A and 8B illustrate the depth image of the target object O and a color that greatly differs in luminance from that of the target object O, respectively. FIG. 8A illustrates a depth image generated with respect to the target object O. Depth images have many noises and are unfit for accurate detection of edges. Therefore, even if a 3D model is generated from only a depth image, it is difficult to generate an accurate model. RGB video images have few noises and are usable for accurate detection of edges if the target object O is in a condition in which a sufficient difference in luminance can be acquired. The method of calculating a depth image from the 3D shape of the target object O and calculating edges from an RGB video image enables generating a more accurate 3D model than in a method of calculating a 3D model from only a depth image. For that purpose, in order to make it easy to calculate edges from an RGB video image, a color that greatly differs in luminance from the target object O is applied to a region in which the target object O is to be located on the mount sheet M.

In step S1001, the CPU 101 converts the approximate shape of the target object O, acquired in step S303 illustrated in FIG. 3, into a gray image. As mentioned in the foregoing, in order to make it easy to detect edges of the target object O, it is desirable to make larger a difference in luminance between portions at which the stage S and the target object O contact each other. For that purpose, the CPU 101 may extract only a region of the target object O located within a predetermined height from the stage S and may convert the extracted region into a gray image.

After completion of the conversion into a gray image, in step S1002, the CPU 101 divides the periphery of the target object O into a plurality of divisional regions. In step S1003, the CPU 101 calculates a gray density value for each divisional region based on an average value of pixels constituting the target object O included in each divisional region. Depending on the mounting position of the camera 109, there may occur a particular region in which a gray image cannot be obtained as an RGB video image cannot be acquired on the stage S. Therefore, the CPU 101 performs processing using the gray density value of a region adjacent to such a particular region.

In step S1004, the CPU 101 determines the gray density value for each region. If the gray density value for the present region is less than 20% (LESS THAN 20% in step S1004), then in step S1005, the CPU 101 sets the candidate color of the present region on the mount sheet M to black, since the color of the target object O is bright color. If the gray density value for the present region is equal to or greater than 20% and less than 80% (20%-80% in step S1004), then in step S1006, the CPU 101 sets the candidate color of the present region on the mount sheet M to white or black, since the color of the target object O is neutral color. In a case where the target object O is of neutral color, edges of the target object O can be detected regardless of whether the color of the present region on the mount sheet M is white or black. If the gray density value for the present region is equal to or greater than 80% (EQUAL TO OR GREATER THAN 80% in step S1004), then in step S1007, the CPU 101 sets the candidate color of the present region on the mount sheet M to white, since the color of the target object O is dark color. FIG. 8B illustrates a color that greatly differs in luminance from the target object O. If the whole surface of the target object O is white in color, since the gray density value is less than 20% for any region of the periphery of the target object O, the CPU 101 sets the candidate color to black.

Figure 9A:
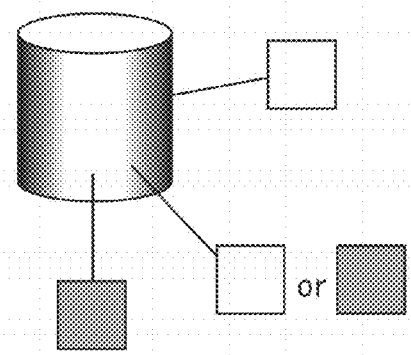
FIGS. 9A, 9B, 9C, and 9D illustrate candidate colors.
Figure 9B:
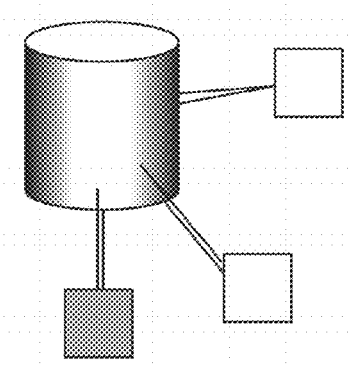
Figure 9C:
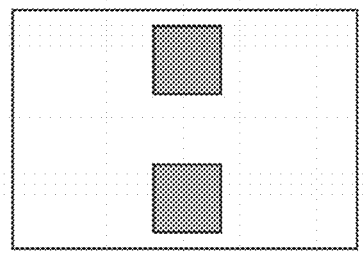
Figure 9D:
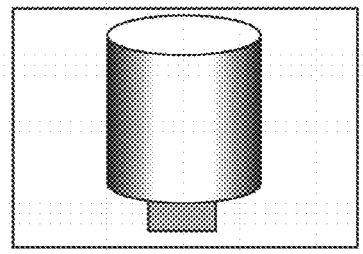

FIGS. 9A, 9B, 9C, and 9D illustrate candidate colors in a case where bright and dark portions are mixed on the periphery of the target object O. As illustrated in FIG. 9A, if bright and dark portions are mixed on the periphery of the target object O, a candidate color that greatly differs in luminance depending on a region on the periphery of the target object O varies. In this case, the candidate color of the mount sheet M is selected from among three types, including white, black, and any of white and black, depending on a region on the periphery of the target object O. In the present exemplary embodiment, the candidate color of a region which may be any of white and black is set to white as much as possible. This setting is performed to reduce the amount of toner consumption in the printer 112 at the time of printing on the mount sheet M. Accordingly, in the case illustrated in FIG. 9A, candidate colors are determined with priority given to white, as illustrated in FIG. 9B. As a result of this, a pattern illustrated in FIG. 9C is printed on the mount sheet M. When the user locates the target object O on the mount sheet M on which such a pattern has been printed, an instruction on the orientation of the target object O is required. FIG. 9D illustrates a case where the orientation of the target object O is guided with the use of the projector 108.

Furthermore, in a case where the target object O is more finely separated into bright and dark portions, if candidate colors are determined with priority given to white, a pattern printed on the mount sheet M may be finely divided. In this case, even if the location of the target object O is guided with the use of the projector 108, fine adjustment becomes required, thus putting stress on the user. Therefore, even in a case where candidate colors are determined with priority given to white, the CPU 101 sets, to black, the candidate color of a region sandwiched between regions the candidate color of which is black. This makes it unnecessary to fine adjust the location of the target object O, thus reducing stress on the user.

For that purpose, if the CPU 101 has determined the candidate colors of all of the regions into which the periphery of the target object O is divided (YES in step S1008), then in step S1009, the CPU 101 extracts each region sandwiched between regions the candidate color of which is black and sets the candidate color of the extracted region to black. In step S1010, the CPU 101 sets, to white, the candidate color of each remaining region the candidate color of which is any of white and black. Upon completion of the determination of the candidate colors of all of the regions, in step S1011, the CPU 101 generates an image for the mount sheet M using the candidate colors set to the respective regions.

Figure 10A:
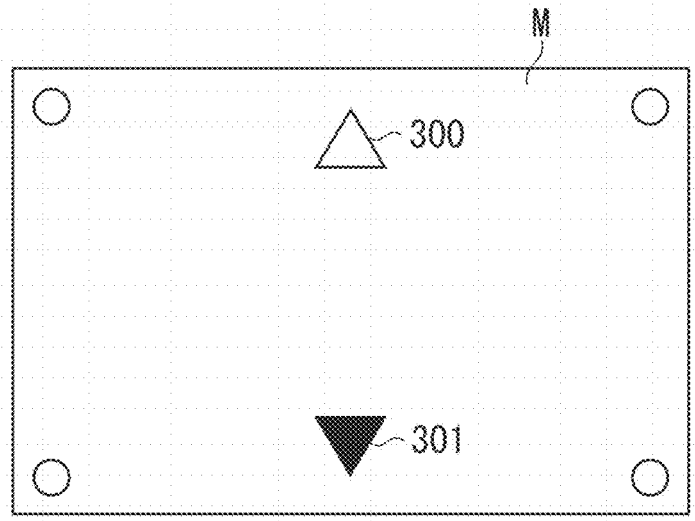
FIGS. 10A and 10B illustrate indexes.
Figure 10B:
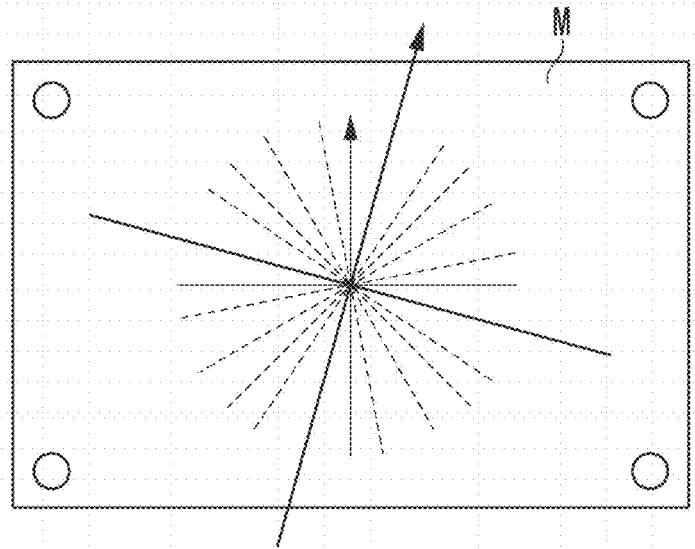

In step S1012, the CPU 101 adds target images, such as indexes, positional markers, a cross line, and bending position lines, to the generated image for the mount sheet M. The indexes include a blue triangle located near a predetermined side of the mount sheet M and a red triangle located near a side opposite the predetermined side. While the 3D scanner 1 notifies, via the projector 108, the user of the rotation direction of the mount sheet M, the indexes serve as markers used when the user rotates the mount sheet M. FIGS. 10A and 10B illustrate the indexes. FIG. 10A illustrates indexes 300 and 301, which are a red triangle and a blue triangle, respectively, printed on the mount sheet M. When the user places the mount sheet M on the stage S, the projector 108 displays a red guide and a blue guide. The user can intuitively understand positioning the mount sheet M only by according the red index 300 with the red guide and according the blue index 301 with the blue guide. Besides the differently-colored triangles, the indexes may be a combination of a solid line and an arrowed line that are intersected in a cross shape, as illustrated in FIG. 10B. In this case, as the projector 108 displays a guide composed of a solid line and an arrowed line that are intersected in a cross shape, the user can intuitively understand positioning the mount sheet M only by according the inclinations of the cross lines with each other.

Figure 11A:
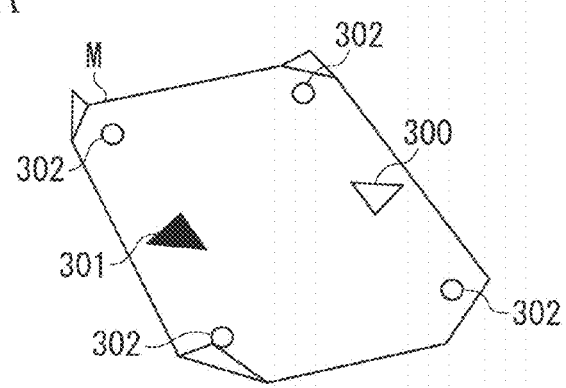
FIGS. 11A, 11B, and 11C illustrate bending position lines.
Figure 11B:
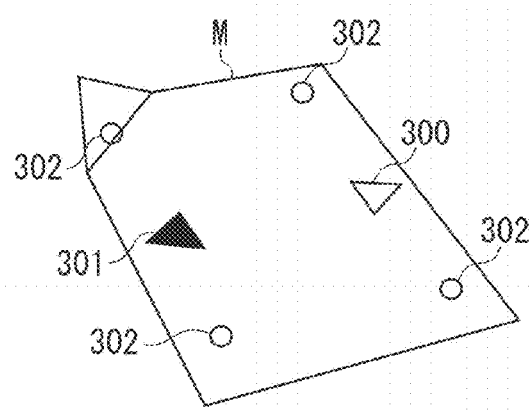
Figure 11C:
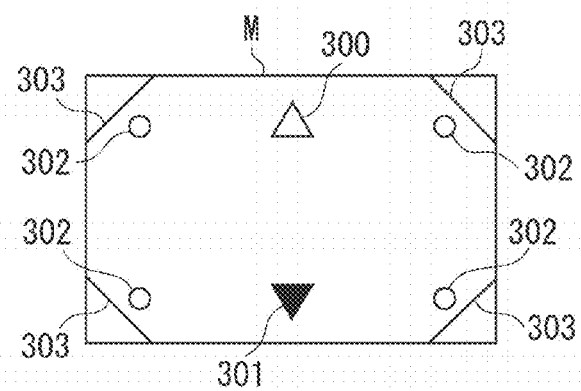

The positional markers are target images for positioning provided near the respective vertices of the mount sheet M. In order to construct an accurate 3D model, the 3D scanner 1 needs to accurately grasp the position of the mount sheet M on the stage S. The positional markers are printed on the mount sheet M so as to enable easily and reliably grasping the position of the mount sheet M. The cross line is provided at the center of the mount sheet M. The cross line is a target image used to indicate, to the user, a position in which to place the target object O. Furthermore, since it is sufficient that the position in which to place the target object O is made clear for the user, the approximate shape of the target object O, instead of the cross line, may be displayed on the mount sheet M. The bending position lines are provided on the side nearer to the corner than the respective positional markers. The user, when rotating the mount sheet M, bends the mount sheet M at each of the bending position lines, so that the user can easily rotate the mount sheet M while gripping the mount sheet M. FIGS. 11A, 11B, and 11C illustrate the bending position lines. Bending the mount sheet M on the side nearer to the corner than the positional marker 302, as illustrated in FIG. 11A, causes no problems. On the other hand, bending the mount sheet M on the side nearer to the center than the positional marker 302, as illustrated in FIG. 11B, makes it impossible for the 3D scanner 1 to detect the position of the positional marker 302, so that the 3D scanner 1 becomes unable to accurately grasp the position of the mount sheet M. Therefore, the bending position line 303 is provided on the side nearer to the corner than the positional marker 302, as illustrated in FIG. 11C.

In step S1013, the CPU 101 registers the positional coordinates of the positional markers 302, the coordinates of the indexes 300 and 301, the shape, the rotation angle, and color information about the region, with the attribute information about the mount sheet M shown in Table 1. Then, the processing ends. In this way, an image to be formed on the mount sheet M is generated.

Figure 12:
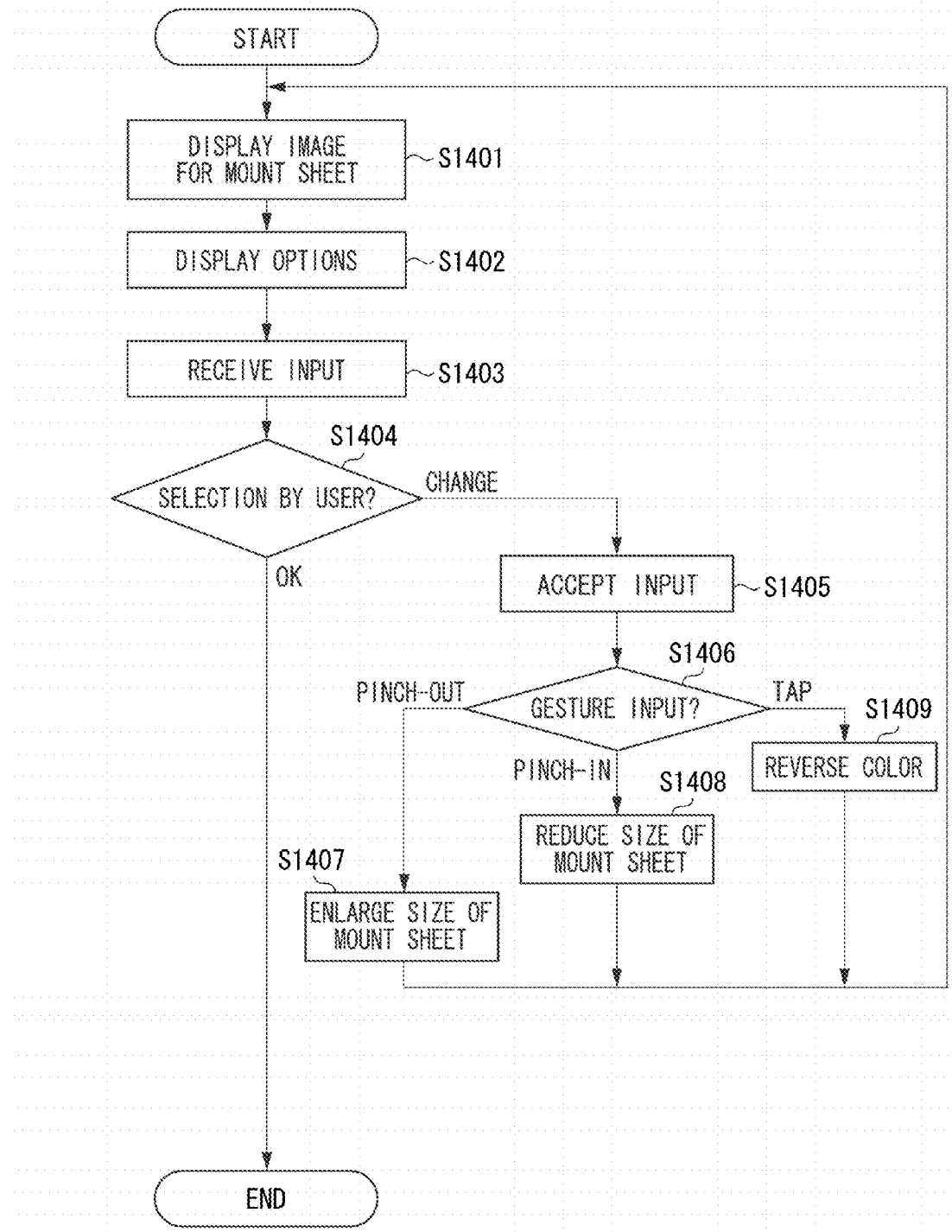
FIG. 12 is a flowchart illustrating confirmation processing performed prior to printing.
Figure 13A:
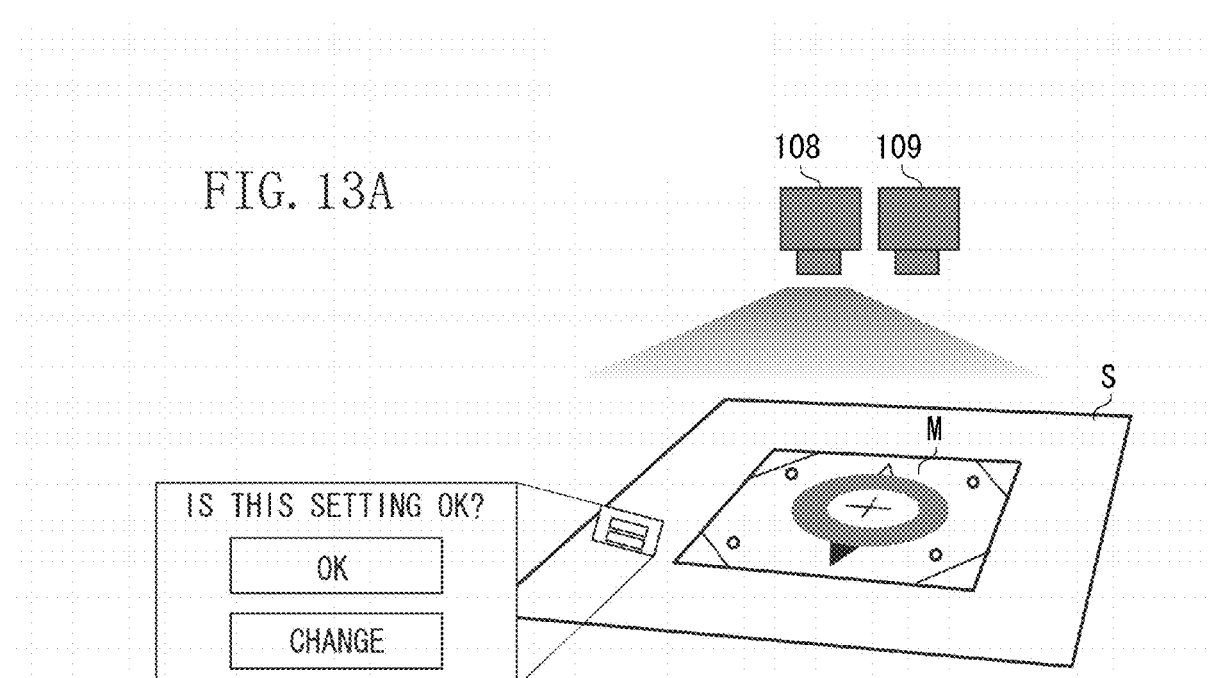
FIGS. 13A, 13B, and 13C illustrate display examples of images for a mount sheet.
Figure 13B:
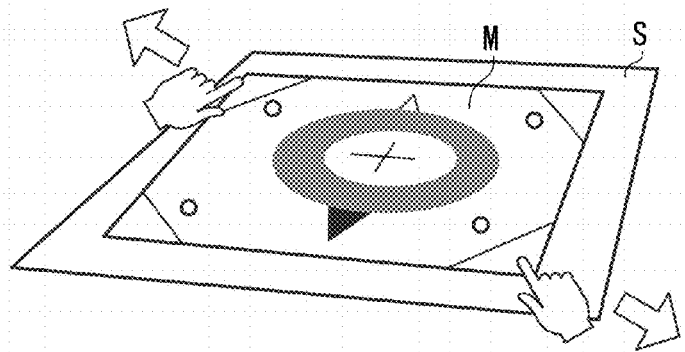
Figure 13C:
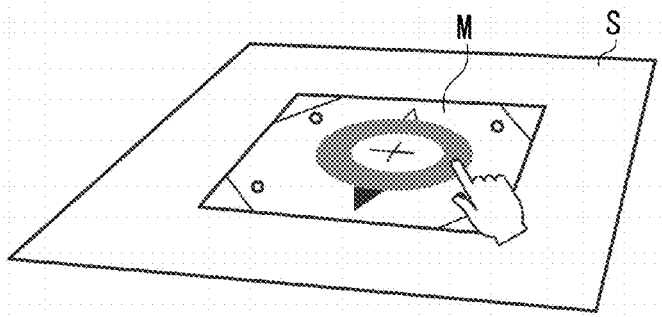

FIG. 12 is a flowchart illustrating confirmation processing for an image performed prior to printing in step S306 illustrated in FIG. 3. The CPU 101 prompts the user to confirm an image, which is to be printed on the mount sheet M, before the printer 112 prints the image. For that purpose, in step S1401, the CPU 101 causes the projector 108 to display, on the stage S, an image that is to be printed on the mount sheet M, based on the attribute information about the mount sheet M. In step S1402, the CPU 101 also causes the projector 108 to display, on the stage S, options used to accept a result of the user's confirmation of the image for the mount sheet M. The options include "OK" and "change". The option "OK" is selected to perform printing on the mount sheet M, and the option "change" is selected to manually make a change to the mount sheet M. FIGS. 13A, 13B, and 13C illustrate examples of images for the mount sheet M, each of which is displayed on the stage S. In the example illustrated in FIG. 13A, the options are displayed on the stage S in a superposed manner together with the image for the mount sheet M.

In step S1403, the CPU 101 receives a gesture input from the user based on a video image captured by the camera 109. If the received gesture input is the selection of the option "OK" (OK in step S1404), the CPU 101 ends the confirmation processing for an image performed prior to printing. If the received gesture input is the selection of the option "change" (CHANGE in step S1404), then in step S1405, the CPU 101 accepts a gesture input. After selecting the option "change", the user performs a gesture input, such as a pinch operation or a tap operation, on the image displayed on the stage S.

If the gesture input is a pinch-out operation (PINCH-OUT in step S1406), then in step S1407, the CPU 101 enlarges the "size" of the attribute information shown in Table 1, in other words, enlarges the size of the mount sheet M. If the gesture input is a pinch-in operation (PINCH-IN in step S1406), then in step S1408, the CPU 101 reduces the "size" of the attribute information shown in Table 1, in other words, reduces the size of the mount sheet M. If the gesture input is a tap operation (TAP in step S1406), then in step S1409, the CPU 101 reverses the color of a region specified by the user on the image for the mount sheet M. According to these gesture inputs, the attribute information is changed. After performing processing according to the gesture input, the CPU 101 causes the projector 108 to display the image for the mount sheet M on the stage S again, thus repeating processing in step S1401 and subsequent steps.

The 3D scanner 1 determines the size of the mount sheet M and the image for the mount sheet M based on the shape of the target object O measured from the depth image (see step S703 illustrated in FIG. 5) and the approximate shape of the target object O (see step S704 illustrated in FIG. 5). However, depending on the positional relationship between the camera 109 and the target object O, the video image of a surface of the target object O on the side that is out of sight from the camera 109 cannot be acquired. Therefore, depending on the shape or color of a surface of the target object O on the side that is out of sight from the camera 109, the appropriate size of the mount sheet M and the appropriate image for the mount sheet M may not be obtained. Therefore, according to the present exemplary embodiment, the 3D scanner 1 prompts the user to confirm the image for the mount sheet M prior to printing thereof, thus allowing the user to change the size of the mount sheet M and the image for the mount sheet M.

For example, when the user enlarges the size of the mount sheet M determined by the 3D scanner 1, the user can perform a pinch-out operation on a preview of the mount sheet M, as illustrated in FIG. 13B, to make the size of the mount sheet M one size larger. Furthermore, if the color of a region of the image for the mount sheet M is not appropriate, the user can perform a tap operation on the region to reverse the color of the region, as illustrated in FIG. 13C.

After completion of the confirmation processing of the image for the mount sheet M, the CPU 101 performs print processing (see step S307 illustrated in FIG. 3). When starting the print processing, the CPU 101 causes the printer 112 to perform paper feeding based on the attribute information about the mount sheet M. In the example of attribute information shown in Table 1, plain paper of A4 size is fed as the paper of the mount sheet M. The CPU 101 causes the printer 112 to print the positional markers A to D, the indexes 1 and 2, and a region to be colored black on the mount sheet M. Furthermore, the CPU 101 causes the printer 112 to print a cross line at the center of the mount sheet M and to print bending position lines on the side nearer to the corner than the respective positional markers A to D in such a manner that each bending position line makes an angle of 45° with the corresponding edge of the mount sheet M.

Figure 14:
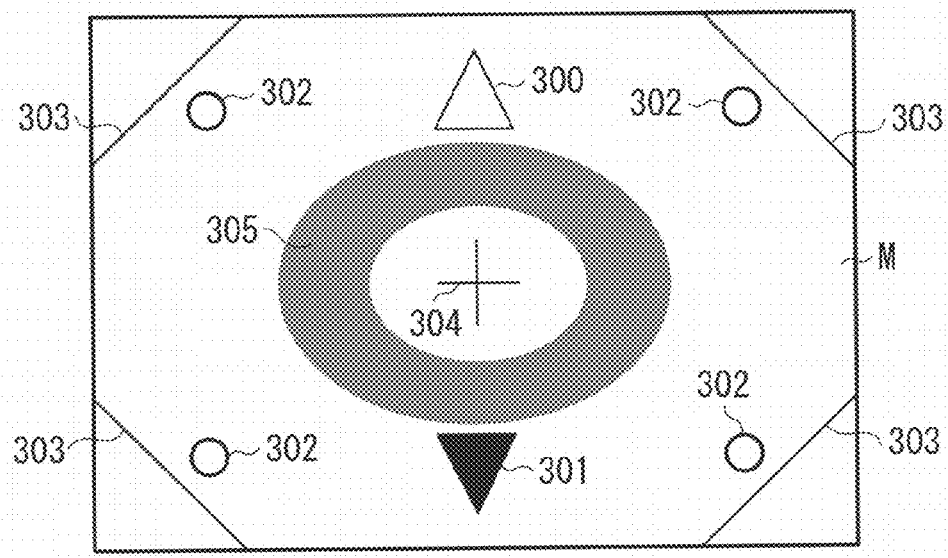
FIG. 14 illustrates an example of the mount sheet.

FIG. 14 illustrates an example of the mount sheet M on which printing has been performed. On the mount sheet M, which is of A4 size, there are printed four positional markers 302 and four bending position lines 303 at the respective four corners. Furthermore, on the mount sheet M, there are printed a cross line 304, which indicates a position in which to locate the target object O, a region 305, to which a color that greatly differs in luminance from the target object O is applied so as to facilitate detecting edges of the target object O when the target object O has been placed, and blue and red indexes 300 and 301, which are used to be accorded with the guides.

Figure 15:
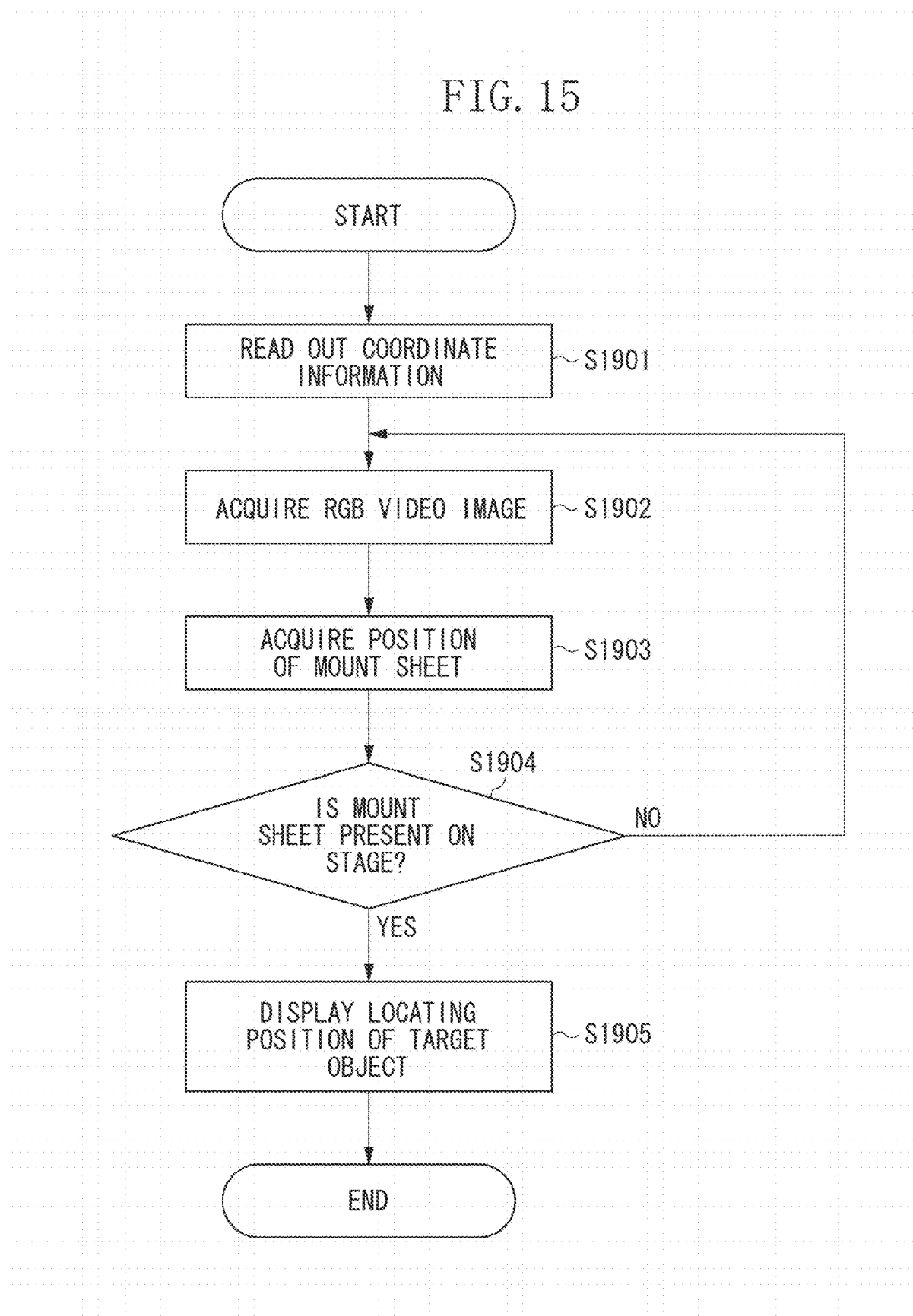
FIG. 15 is a flowchart illustrating mount sheet detection processing.

FIG. 15 is a flowchart illustrating processing for detecting the mount sheet M in step S308 illustrated in FIG. 3. The user locates the mount sheet M, on which an image generated based on the attribute information has been printed in step S307, on the stage S.

In step S1901, the CPU 101 reads out coordinate information about the positional markers 302 from the attribute information about the mount sheet M. In step S1902, the CPU 101 acquires an RGB video image by causing the camera 109 to perform ordinary shooting with visible light. In step S1903, the CPU 101 acquires the position of the mount sheet M according to the positional markers 302 contained in the RGB video image. In step S1904, the CPU 101 determines whether the mount sheet M is present on the stage S based on the acquired position of the mount sheet M. If the mount sheet M is not present on the stage S (NO in step S1904), then in steps S1902 and S1903 again, the CPU 101 acquires an RGB video image via the camera 109 and determines whether the mount sheet M is present on the stage S. If the mount sheet M is present on the stage S (YES in step S1904), then in step S1905, the CPU 101 causes the projector 108 to display a locating position of the target object O (a position in which to place the target object O) on the mount sheet M.

In this way, when the user has placed the mount sheet M on the stage S, the guides indicating a position in which to place the target object O are displayed on the mount sheet M in a superimposed manner. Accordingly, the user can easily and reliably grasp a position in which to place the target object O. In the case of a target object O having bright and dark portions mixed as illustrated in FIG. 9A, in order to enable the user to easily grasp an orientation in which to place the target object O on the mount sheet M, the CPU 101 may cause the projector 108 to additionally display the exterior appearance of the target object O.

Figure 16:
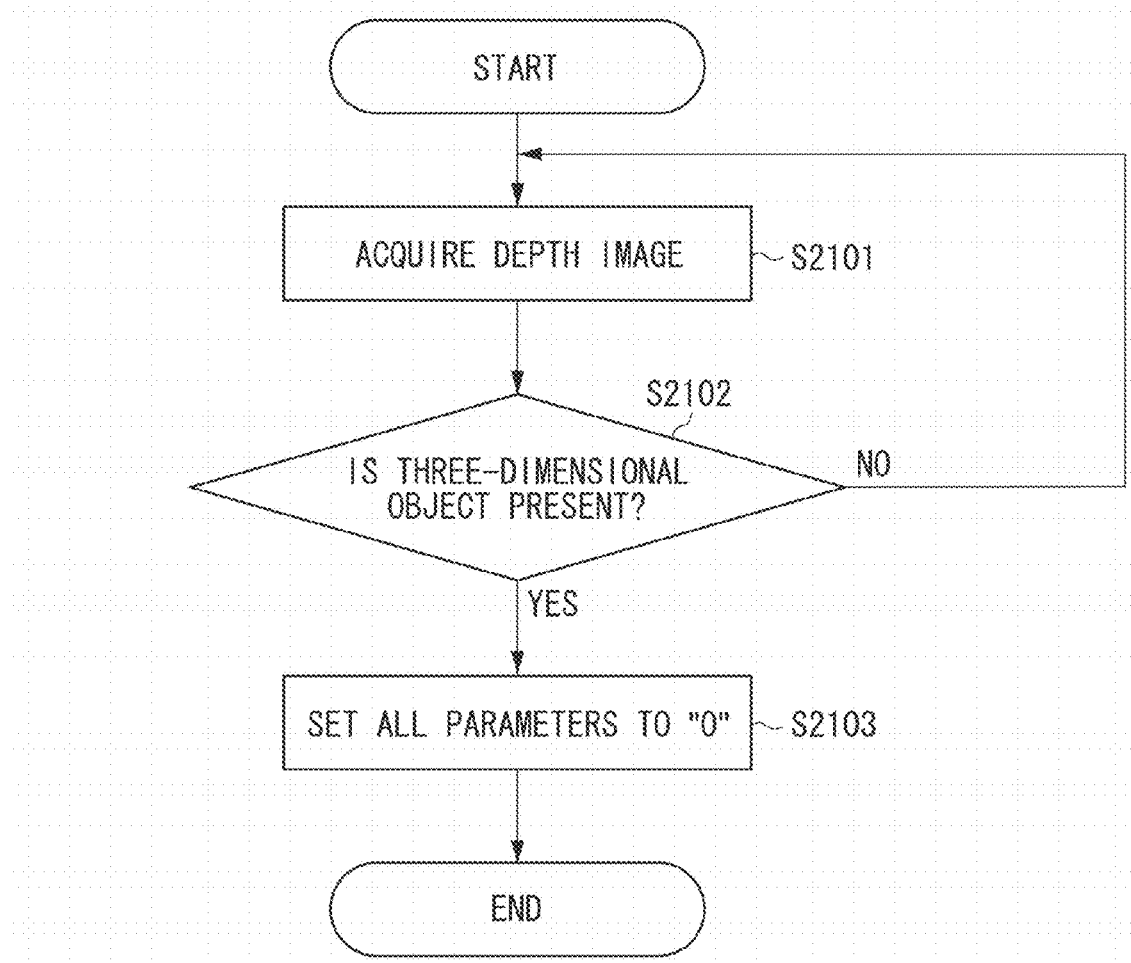
FIG. 16 is a flowchart illustrating target object detection processing.

FIG. 16 is a flowchart illustrating processing for detecting the target object O in step S309 illustrated in FIG. 3. The user locates the target object O on the mount sheet M according to the displayed locating position of the target object O on the mount sheet M.

In step S2101, the CPU 101 acquires a depth image on the mount sheet M based on a video image obtained by the camera 109 performing infrared shooting on the mount sheet M. The acquisition of the depth image is performed by processing similar to that in step S401 illustrated in FIG. 4. In step S2102, the CPU 101 determines whether a three-dimensional object is present on the mount sheet M based on the acquired depth image. The CPU 101 repeats acquiring a depth image until the CPU 101 determines that a three-dimensional object is present on the mount sheet M. If it is determined that a three-dimensional object is present on the mount sheet M (YES in step S2102), then in step S2103, the CPU 101 resets parameters for all directions of rotation history information about the mount sheet M to "0". Then, the processing ends. The rotation history information is a table in which, each time it is detected that the mount sheet M has been rotated, parameters vary according to the direction (angle) of such rotation. The rotation history information is stored into the main memory 104.

In this way, when the user has placed the mount sheet M on the stage S and has then placed the target object O on the mount sheet M, the 3D scanner 1 starts measurement (3D scan) of the target object O. While, in the present exemplary embodiment, the measurement of the target object O starts with processing in step S2102 for checking for the presence of a three-dimensional object on the mount sheet M, the 3D scan may start according to an instruction from the user.

Figure 17:
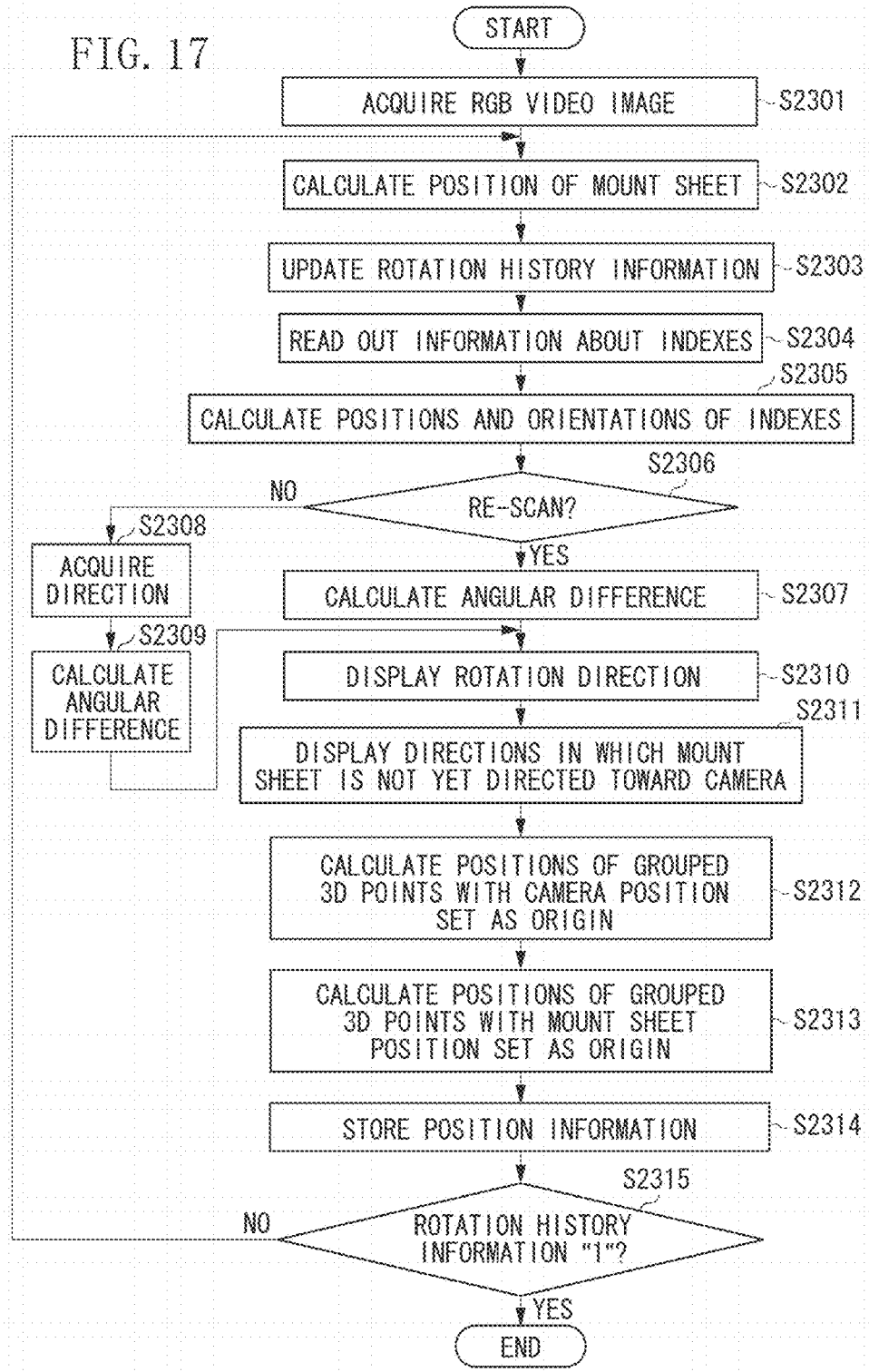
FIG. 17 is a flowchart illustrating target object measurement processing.

FIG. 17 is a flowchart illustrating processing for measuring the target object O in step S310 illustrated in FIG. 3. When having detected that the target object O has been located on the mount sheet M placed on the stage S, the 3D scanner 1 starts measuring the target object O.

Figure 18:
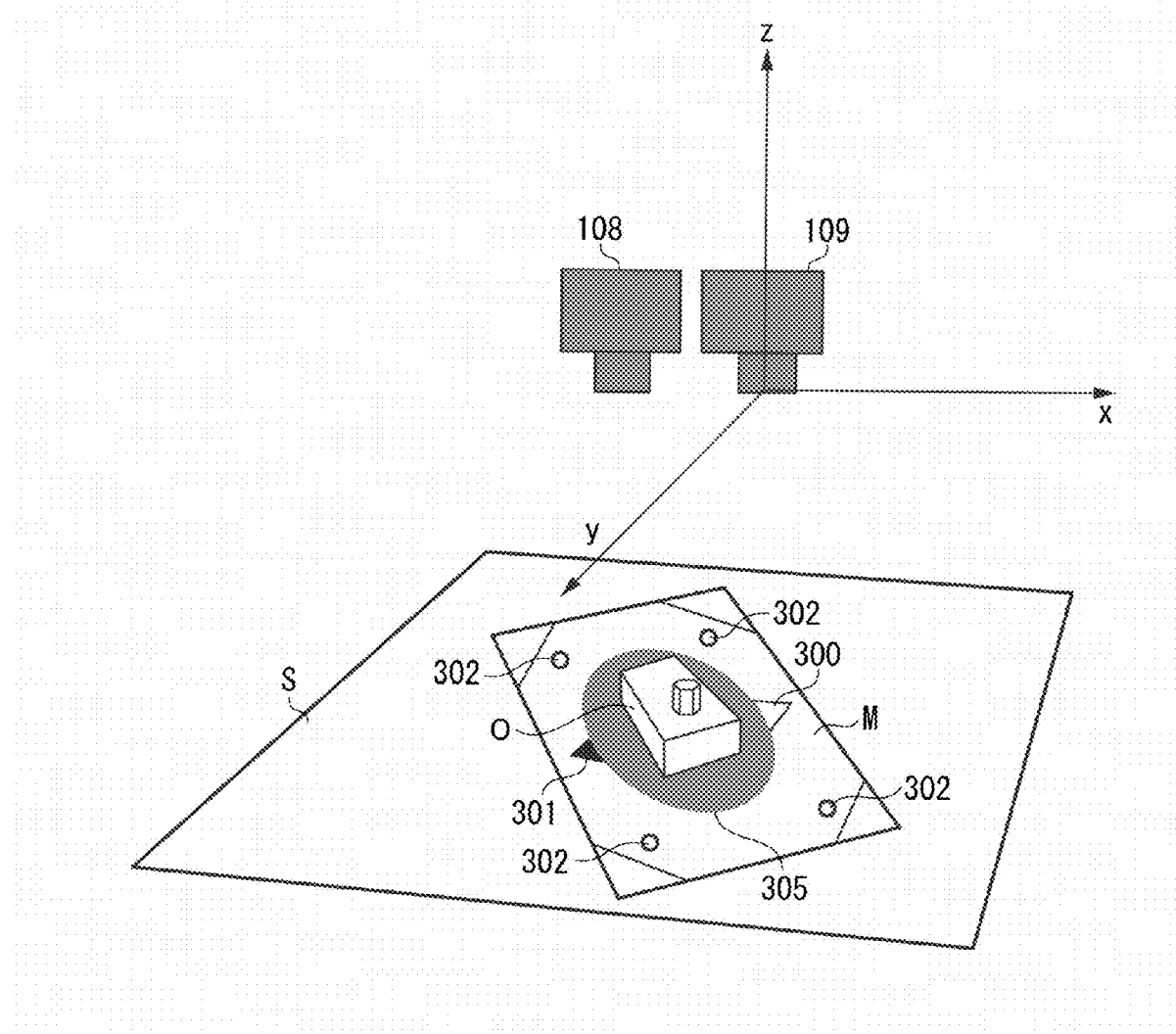
FIG. 18 illustrates a coordinate system with the position of a camera set as the origin.

In step S2301, the CPU 101 acquires an RGB video image on the stage S by causing the camera 109 to perform ordinary shooting with visible light. In step S2302, the CPU 101 detects the positional markers 302 contained in the acquired RGB video image and calculates the position of the mount sheet M with the position of the camera 109 set as the origin. FIG. 18 illustrates a coordinate system with the position of the camera 109 set as the origin. In the coordinate system illustrated in FIG. 18, the directions of two sides bisecting at right angles are respectively set as the x axis and the y axis, and the normal direction to the stage S is set as the z axis. In step S2303, the CPU 101 calculates, based on the calculated position of the target object O, an angle between a line connecting the origin and the center of the mount sheet M and a direction in which the mount sheet M is oriented, as viewed from the z axis direction, and updates a parameter for the detected direction (angle) in the rotation history information about the mount sheet M to "1". The line connecting the origin and the center of the mount sheet M is, for example, a line connecting the center of the RGB video image and the center of the mount sheet M contained in the RGB video image. The direction in which the mount sheet M is oriented is represented by, for example, a line connecting the indexes 300 and 301 contained in the RGB video image. The rotation history information is a table in which a parameter for the calculated angle is set to "1". For example, in a case where the user has rotated the mount sheet M on the stage S half-turn counterclockwise, the rotation history information is set as shown in Table 2 below according to the angle calculated during the rotation. As shown in Table 2, when the mount sheet M is rotated on the stage S half-turn counterclockwise, in the rotation history information, parameters for angles of "0" degrees to "180" degrees are set to "1", and parameters for the other angles are kept to "0".

TABLE 2

| Direction | Parameter |
| --- | --- |
| 0 degrees | 1 |
| 60 degrees | 1 |
| 120 degrees | 1 |
| 180 degrees | 1 |
| 240 degrees | 0 |
| 300 degrees | 0 |

After updating the rotation history information, in step S2304, the CPU 101 reads out information, such as the coordinates of the indexes 300 and 301, the shape, the rotation angle, and the color information, from the attribute information about the mount sheet M (see Table 1). In step S2305, the CPU 101 calculates the positions and orientations of the indexes 300 and 301 with the position of the camera 109 set as the origin based on the read-out information about the indexes 300 and 301. The processing in steps S2301 to S2305 enables the 3D scanner 1 to grasp the accurate position and orientation of the mount sheet M on the stage S.

In step S2306, the CPU 101 determines whether an instruction for re-scan has been issued from the user. The instruction for re-scan is issued when, after the user determines that scanning of the target object O has not been accurately performed, subsequent processing is to be performed. Therefore, in a case where processing in step S2306 is performed for the first time after the measurement processing for the target object O is started, it is determined that the instruction for re-scan has not been issued. If it is determined that the instruction for re-scan has been issued (YES in step S2306), then in step S2307, the CPU 101 calculates an angular difference between the direction specified by the user and the direction in which the mount sheet M is currently oriented. If it is determined that the instruction for re-scan has not been issued (NO in step S2306), then in step S2308, the CPU 101 acquires a direction in which the mount sheet M is not yet directed toward the camera 109, based on the rotation history information about the mount sheet M. For example, the CPU 101 acquires a direction the parameter for which is "0" in the rotation history information. In step S2309, the CPU 101 calculates an angular difference between the acquired direction of the mount sheet M and the direction in which the mount sheet M is currently oriented.

Figure 19A:
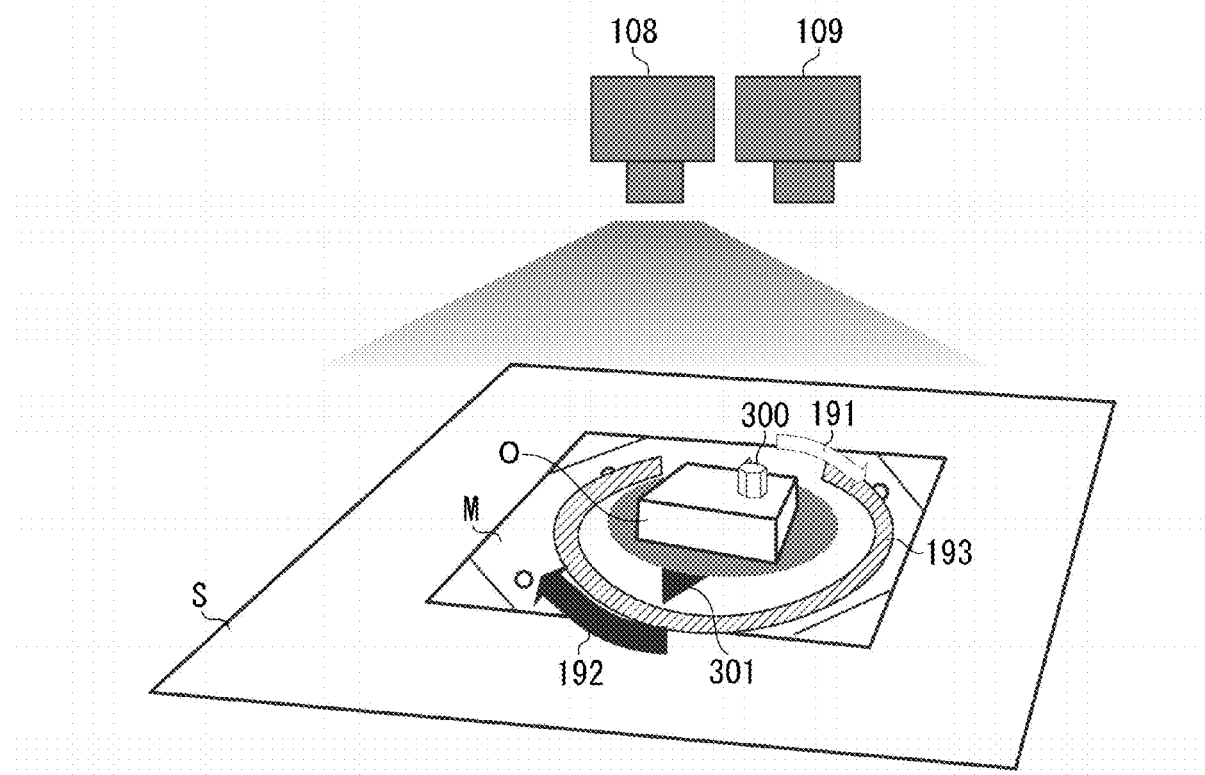
FIGS. 19A and 19B illustrate examples of guides and graphs.
Figure 19B:
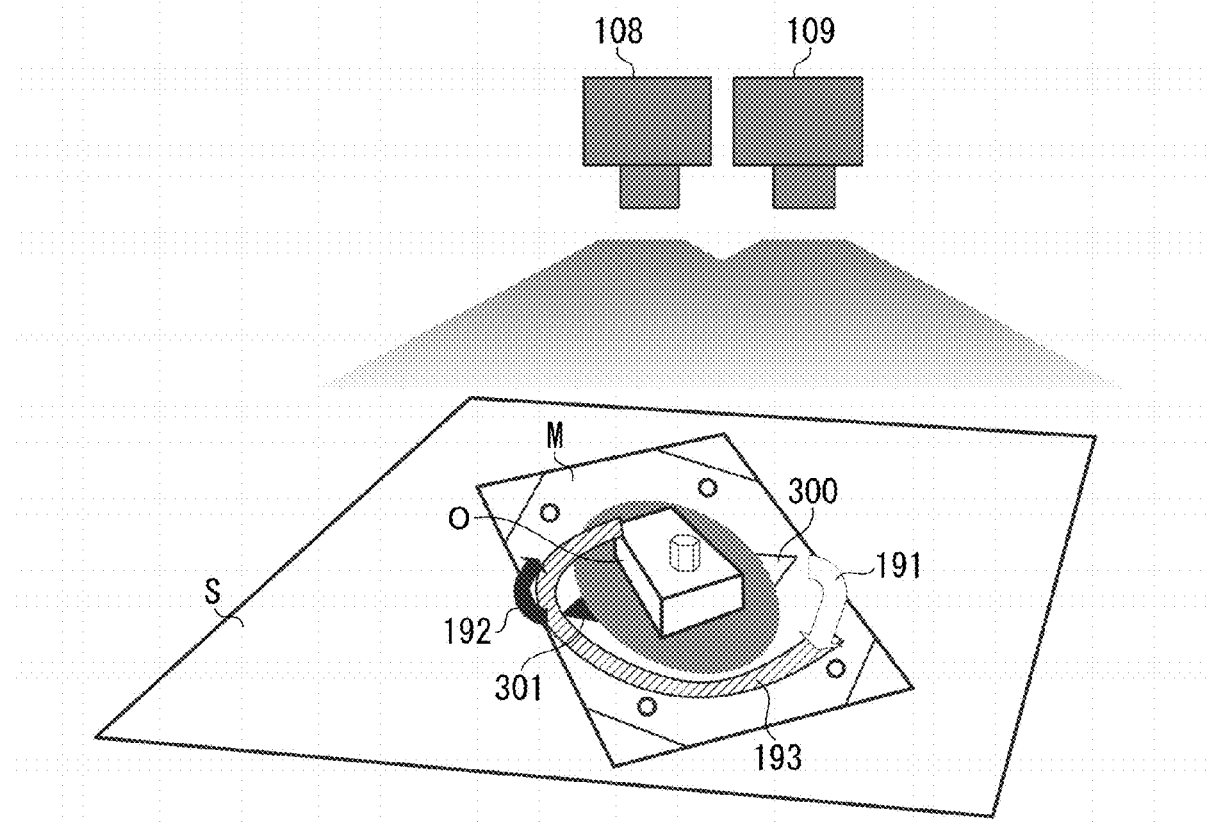

After calculating the angular difference in step S2307 or S2309, then in step S2310, the CPU 101 causes the projector 108 to display guides used to indicate a direction in which to rotate the mount sheet M. The CPU 101 specifies a direction in which to rotate the mount sheet M based on the calculated angular difference and causes the projector 108 to display the guides near the respective indexes in the same colors as those of the respective indexes printed on the mount sheet M. After indicating the direction in which to rotate the mount sheet M, in step S2311, the CPU 101 acquires directions in which the mount sheet M is not yet directed toward the camera 109, based on the rotation history information about the mount sheet M, and causes the projector 108 to display the acquired directions as a circular graph. FIGS. 19A and 19B illustrate examples of the guides and the circular graph. Since the 3D scanner 1 has grasped the accurate position and orientation of the mount sheet M on the stage S up to step S2305, the 3D scanner 1 can accurately grasp a relationship between the position of the mount sheet M and the respective indexes 300 and 301 based on the attribute information about the mount sheet M. Accordingly, in the example illustrated in FIG. 19A, the 3D scanner 1 is able to display the guides 191 and 192, which indicate a direction in which to rotate the mount sheet M, and the circular graph 193 in the respective appropriate positions with respect to the indexes 300 and 301 printed on the mount sheet M.

After displaying the guides 191 and 192 and the circular graph 193, the CPU 101 acquires a depth image of the target object O. The acquisition of the depth image is performed by processing similar to that in step S401 illustrated in FIG. 4. In step S2312, the CPU 101 calculates the positions of grouped 3D points, which constitute a 3D model of the target object O, with the position of the camera 104 set as the origin based on the acquired depth image. In step S2313, the CPU 101 calculates the positions of grouped 3D points in a relative coordinate system with the position of the mount sheet M set as the origin based on the positions of the grouped 3D points with the position of the camera 109 set as the origin and the position of the mount sheet M with the position of the camera 109 set as the origin.

Figure 20:
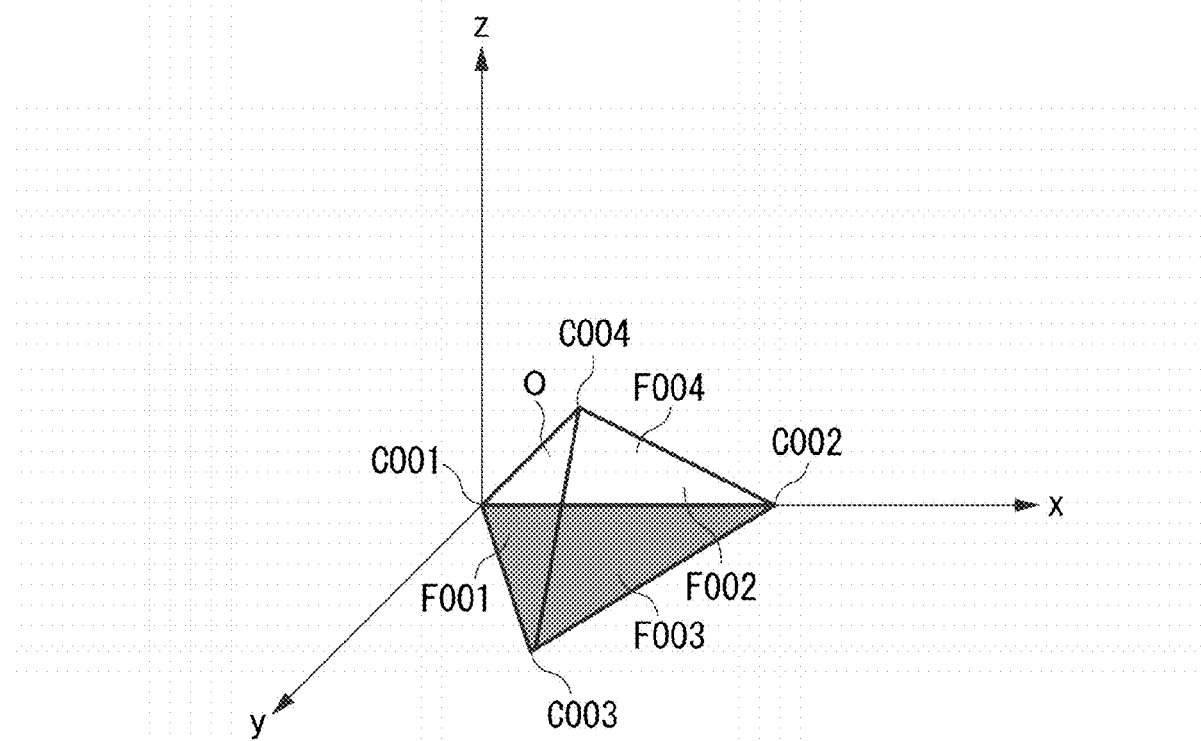
FIG. 20 illustrates an example of a relationship between a target object and a 3D model.

FIG. 20 illustrates an example of a relationship between the target object O and the 3D model. In the example illustrated in FIG. 20, the target object O is a triangular pyramid. In the coordinate system illustrated in FIG. 20, a predetermined position of the mount sheet M is set as the origin. Measuring the target object O, which is a triangular pyramid, results in the measurement of positions of four vertices C001 to C0004 as the grouped 3D points. Pieces of position information indicating the measured positions of the four vertices C001 to C0004 are assigned with respective pieces of unique identification information (coordinate IDs), as shown in Table 3 below, and are recorded as coordinate information about 3D model data, for example, as coordinate values in metric unit system.

TABLE 3

| Coordinate ID | Coordinates |
| --- | --- |
| C001 | (0, 0, 0) |
| C002 | (2, 0, 0) |
| C003 | (1, 2, 0) |
| C004 | (1, 1, 2) |

Figure 21A:
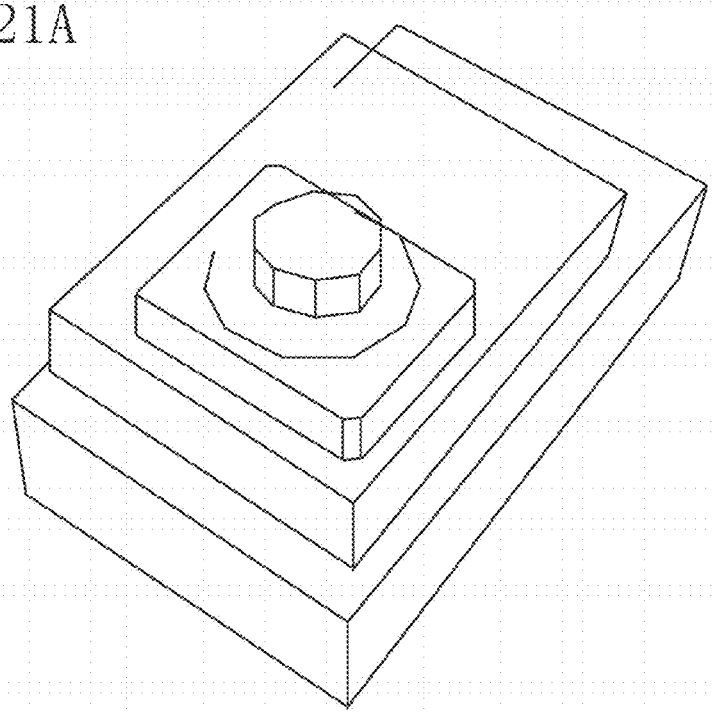
FIGS. 21A and 21B illustrate examples of 3D models.

In step S2314, the CPU 101 stores, into the HDD 107, position information indicating the calculated positions of the grouped 3D points of the target object O. The CPU 101 sequentially adds the calculated position to the position information to be stored into the HDD 107 until the position information about all of the grouped 3D points constituting the target object O is stored in the HDD 107. In the case of the example illustrated in FIG. 19A, a 3D model illustrated in FIG. 21A can be constructed from the position information about the grouped 3D points measured up to then. However, at this point of time, since shooting is not yet performed on surfaces of the target object O on the side that is out of sight from the camera 109, the measurement of the target object O is not yet completed, so that the 3D model is incomplete. In addition, although a portion expressed with a solid line in FIG. 21A is actually a portion expressed with an aggregate of points as illustrated in FIG. 8A, that portion is expressed with a solid line for the purpose of facilitating grasping a portion that is not yet measured.

After storing the position information, in step S2315, the CPU 101 checks for the rotation history information about the mount sheet M and determines whether the parameters for all of the directions (angles) are "1". If it is determined that all of the parameters are "1" (YES in step S2315), the CPU 101 ends the target object measurement processing. If it is determined that at least one parameter is still "0" (NO in step S2315), the CPU 101 repeats processing in step S2302 and subsequent steps until all of the parameters become "1".

Figure 21B:
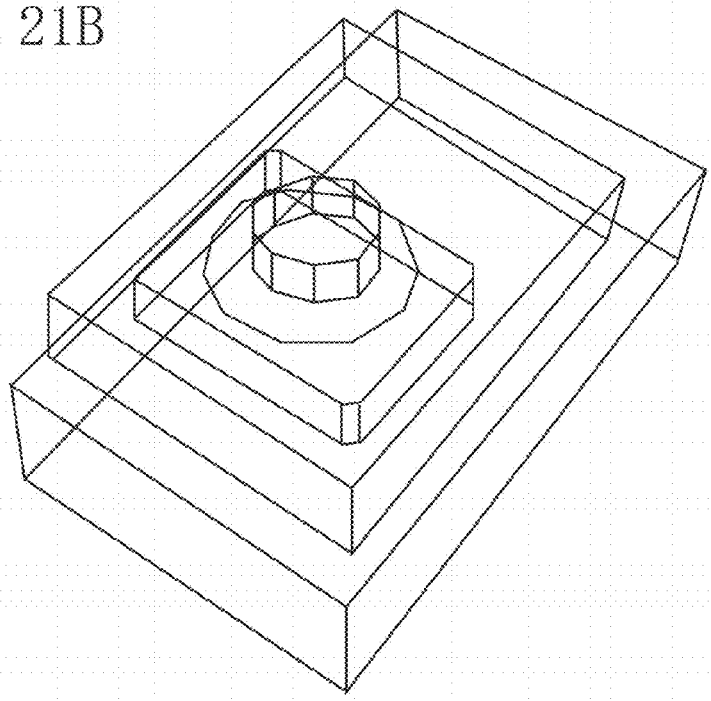

As the user rotates the mount sheet M, the displayed guides 191 and 192 and circular graph 193 vary as illustrated in FIG. 19B. As the user rotates the mount sheet M based on the displayed guides 191 and 192 and circular graph 193, the corresponding parameters in the rotation history information about the mount sheet M are updated to "1". When the mount sheet M has rotated one turn, all of the parameters become "1". When the mount sheet M rotates one turn, measurement is performed on surfaces of the target object O on the side that is out of sight from the camera 109, so that 3D model data is completed based on the position information about all of the grouped 3D points. Thus, a 3D model such as that illustrated in FIG. 21B is constructed based on the position information about the grouped 3D points measured until the mount sheet M is rotated one turn.

FIG. 22 is a flowchart illustrating 3D model checking processing in step S311 illustrated in FIG. 3. After completing the measurement of the target object O, in step S3101, the CPU 101 performs plane extraction processing on the position information about the grouped 3D points constituting a 3D model of the target object O. The plane extraction processing on the grouped 3D points can be performed according to a plane estimation technique using, for example, Random sample consensus (RANSAC). For example, coordinate information shown in Table 3 is obtained by measuring the target object O of the triangular pyramid shape such as that illustrated in FIG. 20. If plane extraction processing is performed on such coordinate information, planes F001 to F004 illustrated in FIG. 20 are extracted. In step S3102, the CPU 101 adds the planes extracted by the plane extraction processing to surface information about the 3D model data. The CPU 101 performs the plane extraction processing on all of the grouped 3D points. If the plane extraction processing is performed on the position information about the grouped 3D points shown in Table 3, surface information shown in Table 4 below is generated. The surface information is composed of coordinate IDs of the grouped 3D points, which are used to define the respective surfaces.

TABLE 4

| Surface ID | Coordinate IDs |
|---|---|
| F001 | C001, C003, C004 |
| F002 | C002, C003, C004 |
| F003 | C001, C002, C003 |
| F004 | C001, C002, C004 |

If the plane extraction processing has been completed on all of the grouped 3D points (YES in step S3103), then in step S3104), the CPU 101 causes the projector 108 to display an end button on the stage S. In step S3105, the CPU 101 performs rendering to generate a 2D plane from the surface information about the 3D model data and causes the projector 108 to display a preview image. The rendering from 3D model data to a 2D plane is performed according to, for example, projective transformation. After displaying the preview image, in step S3106, the CPU 101 accepts a gesture input by the user.

In step S3107, the CPU 101 discriminates the user operation based on the accepted gesture input. If the user operation indicates an end (END in step S3107), the CPU 101 ends the 3D model checking processing. If the user operation is a drag operation (DRAG in step S3107), then in step S3108, the CPU 101 presumes that the user is about to rotate the preview image and changes a rotation parameter used to perform projective transformation from 3D model data to a 2D plane. After changing the rotation parameter, the CPU 101 causes the projector 108 to display a preview image again. If the user operation is a pinch operation (PINCH in step S3107), then in step S3109, the CPU 101 presumes that the user is about to enlarge or reduce the preview image and changes an enlargement/reduction parameter used to perform projective transformation from 3D model data to a 2D plane. After changing the enlargement/reduction parameter, the CPU 101 causes the projector 108 to display a preview image again. If the user operation is a tap operation (TAP in step S3107), then in step S3110, the CPU 101 converts a rotation parameter for the preview image at the time of the tap operation into orientation information about the target object O relative to the camera 109, and stores the orientation information as a direction specified by the user. Then, the processing ends. In the case of the tap operation, the user instructs the 3D scanner 1 to perform re-scan.

Figure 23:
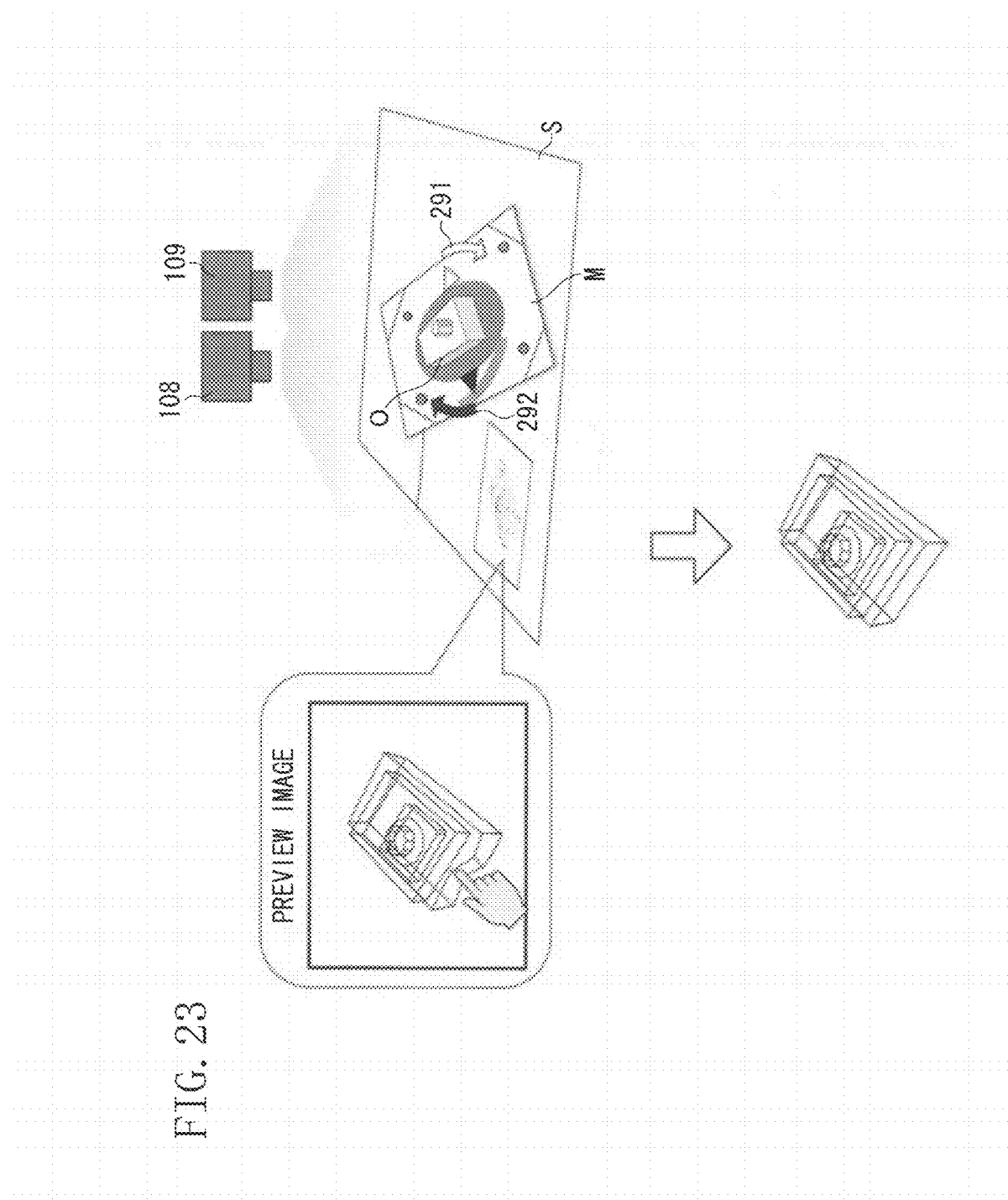
FIG. 23 illustrates a manner in which the 3D model checking processing is performed.

FIG. 23 illustrates a manner in which the 3D model checking processing is performed. When the user touches, on a preview image, a region that is deemed not to have been correctly 3D scanned, guides 291 and 292, which indicate directions enabling the touched region to be scanned, are displayed. As the user rotates the mount sheet M according to the guides 291 and 292, re-scan is performed on a region that has not been correctly 3D scanned. Accordingly, correcting a 3D model in such a manner enables realizing a more accurate 3D model.

According to processing in steps S2310 and S2311 illustrated in FIG. 17, the guides 191 and 192 and the circular graph 193 are displayed (see FIG. 19). However, in a case where an instruction is issued to the user to move the mount sheet M to a specific position on the stage S, an instruction according to which a position to which the mount sheet M is to be moved is uniquely determined is more useful for the user to easily grasp the instruction.

Therefore, there is adopted a method of displaying, in positions to which the indexes 300 and 301 are to be moved, guide images with which the indexes 300 and 301 conform in shape. In this instance, the CPU 101 causes the projector 108 to display graphics coinciding in color and shape with the respective indexes 300 and 301 printed on the mount sheet M, in positions to which the indexes 300 and 301 are to be moved based on the angular difference calculated in step S2307 or S2309. Thus, the user can easily locate the target object O in an appropriate position by rotating the mount sheet M in such a manner that the indexes 300 and 301 printed on the mount sheet M lap over the displayed graphics.

For example, in a case where a red triangular index 300 and a blue triangular index 301 are printed on the mount sheet M (see FIG. 10A), the CPU 101 causes the projector 108 to display a red triangular frame border and a blue triangular frame border as guides in respective positions to which the respective indexes 300 and 301 are to be moved. This enables the user to uniquely grasp a position to which to move the mount sheet M, so that the user only needs to move the mount sheet M in such a manner that the triangles of the indexes 300 and 301 lap over the guides in the respective same colors. Therefore, the user can easily and reliably move the mount sheet M.

Furthermore, there may be adopted a method of displaying, in a position to which to move the mount sheet M, a guide image with which the mount sheet M conforms in shape. The CPU 101 causes the projector 108 to display, in a position to which to move the mount sheet M based on the calculated angular difference, a graphic coinciding in shape with the mount sheet M. The user rotates the mount sheet M in such a manner that the mount sheet M laps over the displayed graphic. For example, the CPU 101 causes the projector 108 to display a quadrangular frame border in a position to which to move the mount sheet M. This enables the user to uniquely grasp a position to which to move the mount sheet M, so that the user only needs to move the mount sheet M in such a manner that the mount sheet M laps over the quadrangular frame border serving as a guide. Therefore, the user can easily and reliably move the mount sheet M.

As described above, according to the above-described exemplary embodiments, 3D scan is performed with a target object located on a mount sheet, and an image indicating a direction in which to move the mount sheet is displayed. The user moves the mount sheet relying on the image indicating a direction in which to move the mount sheet. Accordingly, the user can promptly locate the target object in an appropriate position.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-162942 filed Aug. 8, 2014, which is hereby incorporated by reference herein in its entirety.

What is claimed is:

1. A 3D scanner comprising:
   a stage on which a target object, which is targeted for scan, is to be located;
   a location object that is to be placed on the stage during scan and on which the target object is to be located during scan;
   a display unit configured to display an image on the stage;
   an imaging unit configured to perform image capturing on the stage; and
   a control unit configured to generate 3D model data of the target object based on a video image of the target object captured by the imaging unit, and to cause the display unit to display, on the stage, an image indicating a direction in which to move the target object, based on video images of the target object and the location object captured by the imaging unit.

2. The 3D scanner according to claim 1, wherein the control unit causes the display unit to display, on the stage, a rotation direction of the location object enabling performing image capturing on a surface of the target object that is not yet subjected to image capturing by the imaging unit.

3. The 3D scanner according to claim 1, wherein the location object has, printed thereon, a target image serving as a marker for a position where the location object is placed on the stage, and
   wherein the control unit indicates the direction in which to move the location object with a direction in which the target image moves.

4. The 3D scanner according to claim 3, further comprising a printing unit configured to print the target image on the location object, and
   wherein the control unit acquires an approximate shape of the target object based on a video image of the target object captured by the imaging unit without the location object being placed on the stage, determines, based on the acquired approximate shape, a size of the location object and the target image to be printed on the location object, and causes the printing unit to print the target image on a sheet of the determined size.

5. The 3D scanner according to claim 4, wherein the control unit causes the printing unit to print, on the location object, a target image serving as a marker used when the location object is moved, a target image used for positioning when the location object is placed on the stage, a target image indicating a bending position of the location object and provided on a side nearer to a periphery of the location object than the target image used for positioning, and a target image indicating a position in which to locate the target object during scan.

6. The 3D scanner according to claim 5, wherein the control unit causes the printing unit to provide, on the location object, a region to which white color or black color is applied in such a manner that the region greatly differs in luminance from the target object when the target object is placed on the location object during scan, based on the approximate shape of the target object.

7. The 3D scanner according to claim 6, further comprising a storage unit configured to store attribute information about the location object including the size of the location object, positions of the target images to be printed on the location object, and the color of the region,
wherein the control unit causes the display unit to display an image generated according to the attribute information before the image is printed on the location object, and changes the attribute information according to a video image of a user's gesture on the image captured by the imaging unit.

8. The 3D scanner according to claim 1, wherein the control unit detects that the location object has been placed on the stage based on a video image captured by the imaging unit, and
wherein the control unit, when having detected that the location object has been placed on the stage, causes the display unit to display, on the location object, a position in which to locate the target object.

9. The 3D scanner according to claim 1, further comprising a second storage unit configured to store rotation history information in which parameters vary according to an orientation of the target object on the stage,
wherein the control unit detects whether the target object has been located on the location object based on a video image captured by the imaging unit, and, when having detected that the target object has been located on the location object, resets the rotation history information.

10. The 3D scanner according to claim 9, wherein, when having detected that the target object has been located on the location object, the control calculates an orientation of the location object based on a video image captured by the imaging unit and updates a parameter for the calculated orientation in the rotation history information.

11. The 3D scanner according to claim 10, wherein the control unit causes the display unit to display, on the stage, an image indicating a direction in which to move the location object in such a manner as to enable the imaging unit to perform image capturing on a surface of the target object that is not yet subjected to image capturing by the imaging unit, based on the rotation history information.

12. The 3D scanner according to claim 10, wherein the control unit generates 3D model data of the target object based on a video image captured by the imaging unit until all of the parameters in the rotation history information are updated.

13. The 3D scanner according to claim 12, wherein the control unit causes the display unit to display a preview image of a 3D model of the target object based on the generated 3D model data, and to change display of the preview image according to a video image of a user's gesture on the preview image captured by the imaging unit.

14. The 3D scanner according to claim 13, wherein the control unit causes the display unit to display, on the stage, an image indicating a direction in which to move the location object in such a way as to enable the imaging unit to perform image capturing on a position indicated by a video image of a user's gesture on the preview image captured by the imaging unit.

15. A 3D scan method executable by an apparatus including a stage on which a target object, which is targeted for scan, is to be located, a location object that is to be placed on the stage during scan, a display unit configured to display an image on the stage, and an imaging unit configured to perform image capturing on the stage, the 3D scan method comprising:
detecting that the location object has been placed on the stage and the target object has also been located on the location object, based on a video image captured by the imaging unit;
causing the display unit to display, on the stage, an image indicating a direction in which to move the location object, based on video images of the target object and the location object captured by the imaging unit after detecting that the target object has been located on the location object; and
generating 3D model data of the target object based on a video image captured by the imaging unit performing image capturing on the target object from all directions.

16. A non-transitory computer-readable storage medium storing a computer program that causes a computer, which includes a stage on which a target object, which is targeted for scan, is to be located, a location object that is to be placed on the stage during scan and on which the target object is to be located during scan, a display unit configured to display an image on the stage, and an imaging unit configured to perform image capturing on the stage, to act as:
a control unit configured to generate 3D model data of the target object based on a video image of the target object captured by the imaging unit, and to cause the display unit to display, on the stage, an image indicating a direction in which to move the target object, based on video images of the target object and the location object captured by the imaging unit.

* * * * *